(12) United States Patent
Guan et al.

(10) Patent No.: US 10,708,898 B2
(45) Date of Patent: Jul. 7, 2020

(54) DETECTING METHOD, TRANSMITTING METHOD AND APPARATUS FOR COMMON CONTROL CHANNEL

(71) Applicant: HUAWEI TECHNOLOGIES CO., LTD., Shenzhen, Guangdong (CN)

(72) Inventors: Lei Guan, Beijing (CN); Lixia Xue, Beijing (CN); Yongxing Zhou, Beijing (CN); Qiang Li, Shenzhen (CN); Jingyuan Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/887,061

(22) Filed: Feb. 2, 2018

(65) Prior Publication Data

US 2018/0199318 A1 Jul. 12, 2018

Related U.S. Application Data

(63) Continuation of application No. 14/802,555, filed on Jul. 17, 2015, now Pat. No. 9,913,265, which is a
(Continued)

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04L 5/0073* (2013.01);
(Continued)

(58) Field of Classification Search
CPC ... H04W 72/042; H04L 5/0053; H04L 5/0073
See application file for complete search history.

(56) References Cited

U.S. PATENT DOCUMENTS 9,065,630 B1 6/2015 Xiao et al.
9,166,718 B2 * 10/2015 Chen .................. H04W 4/70
(Continued)

FOREIGN PATENT DOCUMENTS

CN 101601194 A 12/2009
CN 101690340 A 3/2010
(Continued)

OTHER PUBLICATIONS

Chinese Office Action issued in Chinese Application No. 201480036853.9 dated Feb. 28, 2019, 12 pages.
(Continued)

*Primary Examiner* — Robert C Scheibel
(74) *Attorney, Agent, or Firm* — Fish & Richardson P.C.

(57) ABSTRACT

Embodiments of the present invention provide a detecting method, a transmitting method and an apparatus for a common control channel. The detecting method includes: determining a candidate resource set within virtual downlink resources of a current cell. The candidate resource set can include at least one candidate resource carrying a common control channel of the current cell. A detection is performed on at least one candidate resource in the candidate resource set, so as to acquire the common control channel of the current cell. In the embodiments of the present invention, a selection range of resources for transmitting a common control channel is extended, so that inter-cell interference of the common control channel can be coordinated, and a detection performance of the common control channel can be improved.

15 Claims, 5 Drawing Sheets

Related U.S. Application Data continuation of application No. PCT/CN2013/070726, filed on Jan. 18, 2013.

(51) Int. Cl.
  *H04L 12/24* (2006.01)
  *H04L 12/751* (2013.01)
  *H04W 48/12* (2009.01)
  *H04W 88/02* (2009.01)

(52) U.S. Cl.
  CPC ............ *H04L 41/12* (2013.01); *H04L 45/02* (2013.01); *H04W 48/12* (2013.01); *H04L 5/0007* (2013.01); *H04W 72/04* (2013.01); *H04W 88/02* (2013.01)

(56) References Cited

U.S. PATENT DOCUMENTS

| | | |
|---|---|---|
| 9,615,343 B2 | 4/2017 | Seo |
| 2002/0006176 A1 | 1/2002 | Motojima |
| 2008/0181194 A1 | 7/2008 | Lindoff et al. |
| 2009/0196279 A1 | 8/2009 | Kim et al. |
| 2010/0020905 A1 | 1/2010 | Mansour et al. |
| 2010/0118839 A1 | 5/2010 | Malladi et al. |
| 2010/0135257 A1 | 6/2010 | Higuchi et al. |
| 2010/0250688 A1 | 9/2010 | Sachs et al. |
| 2011/0013531 A1 | 1/2011 | Liu |
| 2011/0069637 A1 | 3/2011 | Liu et al. |
| 2011/0092200 A1 | 4/2011 | Charbit et al. |
| 2011/0261767 A1 | 10/2011 | Ji et al. |
| 2012/0008615 A1 | 1/2012 | Inoue et al. |
| 2012/0231790 A1 | 9/2012 | Lindoff et al. |
| 2013/0107851 A1 | 5/2013 | Park et al. |
| 2013/0142138 A1 | 6/2013 | Dinan |
| 2013/0201913 A1 | 8/2013 | Niemela |
| 2014/0016596 A1 | 1/2014 | Kim et al. |
| 2014/0036820 A1 | 2/2014 | McNamara et al. |
| 2014/0192759 A1 | 7/2014 | Son et al. |
| 2014/0269605 A1 | 9/2014 | Pecen et al. |
| 2014/0341175 A1 | 11/2014 | Beale et al. |
| 2015/0063265 A1 | 3/2015 | Seo et al. |
| 2015/0319023 A1 | 11/2015 | Luo et al. |
| 2015/0333859 A1 | 11/2015 | Lindoff et al. |
| 2015/0341803 A1 | 11/2015 | Kim et al. |
| 2016/0112979 A1 | 4/2016 | Takano |
| 2016/0338056 A1 | 11/2016 | Xue et al. |

FOREIGN PATENT DOCUMENTS

| | | | |
|---|---|---|---|
| CN | 101924724 A | 12/2010 | |
| CN | 101932075 A | 12/2010 | |
| CN | 102014462 A | 4/2011 | |
| CN | 102113254 A | 6/2011 | |
| CN | 102123432 A | 7/2011 | |
| CN | 102238610 A | 11/2011 | |
| CN | 102355325 A | 2/2012 | |
| CN | 102362455 A | 2/2012 | |
| CN | 102378190 A | 3/2012 | |
| CN | 102438249 A | 5/2012 | |
| CN | 102484871 A | 5/2012 | |
| CN | 102547738 A | 7/2012 | |
| CN | 102595605 A | 7/2012 | |
| CN | 102752769 A | 10/2012 | |
| CN | 102843180 A | 12/2012 | |
| CN | 102843747 A | 12/2012 | |
| CN | 102858014 A | 1/2013 | |
| CN | 103068032 A | 4/2013 | |
| CN | 103379079 A | 10/2013 | |
| EP | 2696548 A2 | 2/2014 | |
| JP | 2010507315 A | 3/2010 | |
| JP | 2011504310 A | 2/2011 | |
| JP | 2012533933 A | 12/2012 | |
| WO | 2009147498 A1 | 12/2009 | |
| WO | WO-2009147498 A1 * | 12/2009 | .......... H04J 11/0069 |
| WO | 2010116880 A1 | 10/2010 | |
| WO | 2012104629 A2 | 8/2012 | |
| WO | 2012104634 A1 | 8/2012 | |
| WO | 2012138097 A2 | 10/2012 | |

OTHER PUBLICATIONS

Damnjanovic et al, "UE"s Role in LTE Advanced Heterogeneous Networks," IEEE Communications Magazine, vol. 50, Issue 2, pp. 164-176, Institute of Electrical and Electronic Engineers, New York, New York (Feb. 9, 2012).

Common Search Space Design for ePDCCH, 3GPPP TSG-RAN WG1 Meeting #6,Dresden, Germany, R1-120280, 3rd Generation Partnership Project, Valbonne, France(Feb. 6-10, 2012).

Physical Channel Concept for Scalable Bandwidth in Evolved UTRA Downlink, 3GPP TSG RAN WG1 Ad Hoc on LTE, Sophia Antipolis, France, R1-050592, 3rd Generation Partnership Project, Valbonne, France (Jun. 20-21, 2005).

Pilot Sequence Allocation Method in E-Utra Uplink, 3GPP TSG RAN WG1 LTE,Cannes, France, R1-061678, 3rd Generation Partnership Project, Valbonne, France (Jun. 27-30, 2006).

Ericsson et al., "New WI Proposal: New Carrier Type for LTE-Core Part," 3GPP TSG-RAN Meeting #57, Chicago, USA, RP-121415, 3rd Generation Partnership Project,Valbonne, France, (Sep. 4-7, 2012).

Erricson et al., "New WI Proposal: New Carrier Type for LTE-Feature," 3GPP TSG-RAN Meeting #57, Chicago, USA, RP-121415, 3rd Generation Partnership Project,Valbonne, France, (Sep. 4-7, 2012).

Erricson et al., "New WI Proposal: New Carrier Type for LTE-Performance Part,"3GPP TSG-RAN Meeting #57, Chicago, USA, RP-121415, 3rd Generation Partnership Project, Valbonne France, (Sep. 4-7, 2012).

3GPP TS 36.321 V11.1.0 (Dec. 2012) ; 3rd Generation Partnership Project;Technical Specification Group Radio Access Network;Evolved Universal Terrestrial Radio Access (E-UTRA);Medium Access Control (MAC) protocol specification (Release 11),total 57 pages.

Issue Notification issued in Chinese Application No. 201810724451.8 dated Apr. 26, 2019, 4 pages.

Notice of Allowance issued in Chinese Application No. 201810724451.8 dated Apr. 26, 2019, 1 page.

Office Action issued in Chinese Application No. 2018111802440.9 dated Apr. 28, 2019, 6 pages.

Extended European Search Report issued in European Application No. 19184591.6 dated Mar. 26, 2020, 7 pages.

Motorola Mobility, "Configuration of EPDCCH," 3GPP TSG RAN WG1 #70, R1-123788; QingDao, PR China, Aug. 13-18, 2012, 6 pages.

* cited by examiner

DETECTING METHOD, TRANSMITTING METHOD AND APPARATUS FOR COMMON CONTROL CHANNEL

CROSS-REFERENCE TO RELATED APPLICATIONS

This application is a continuation of U.S. patent application Ser. No. 14/802,555, filed on Jul. 17, 2015, now U.S. Pat. No. 9,913,265, which is a continuation of International Application No. PCT/CN2013/070726, filed on Jan. 18, 2013. The afore-mentioned patent applications are hereby incorporated by reference in their entireties.

TECHNICAL FIELD

The present invention relates to the communication field, and more particularly to a detecting method, a transmitting method and an apparatus for a common control channel.

BACKGROUND

A primary synchronization signal (PSS) and a secondary synchronization signal (SSS) are transmitted at a period of 5 subframes, the frequency domain is located within a frequency domain width of 6 resource blocks in the center of a carrier, and the time domain occupies two symbols. A time domain of a physical broadcast channel (PBCH) occupies the first four symbols of the second time slots in subframe 0, and the frequency domain thereof is also located within a frequency domain width of 6 resource blocks in the center of a carrier. The PBCH carries downlink carrier bandwidths, therefore, before the PBCH is detected, a user equipment (UE) only can identify a downlink carrier bandwidth within a frequency domain width of 6 resource blocks in the center of a currently-detected carrier, that is, both the synchronization signals and the PBCH must be placed in the downlink resource bandwidth within a frequency domain width of 6 resource blocks in the center of carrier. A system information block (SIB) can be divided into SIB1 through SIB13, the SIB1 is transmitted at a period of 20 ms, and is located on a subframe 5 of an even radio frame in time, the frequency domain resources are scheduled based on a physical downlink control channel (PDCCH), and the PDCCH is located in a common search space, i.e., the search space that all the UEs should detect; a time window for transmitting other SIB is allocated via the SIB1, but specific time and frequency domain resources are also scheduled based on the PDCCH. The PDCCH is located within a control area, which is at the first n symbols of one subframe, n is one of natural numbers from 1 to 4, the frequency domain thereof occupies the whole bandwidth of the carrier, and the transmitted PDCCH is broke up into the whole bandwidth through interleaving to obtain frequency diversity gain.

The UE is accessed to a base station in a process as follows: the PSS is firstly detected, and then the SSS is detected through the time domain positional relationship of the PSS and the SSS, to make initial synchronization of the time domain, including synchronization of symbol, subframe and frame; a physical cell identifier (PCI) also can be acquired through the sequence combination of detected PSS and SSS, a cyclic prefix length is determined through an time interval between PSS and SSS, and etc.; then the system information is read, PBCH is firstly read to acquire a bandwidth of a downlink system, an antenna port for a cell-specific reference signal (CRS), a system frame number, a physical hybrid automatic repeat request indicator channel (PHICH) configuration information and etc.; then SIB1 is read, and other SIBs are read according to configuration of the SIB1; and a random access signal is finally transmitted to establish radio resource control connection with the base station, and afterwards, normal data transmission can be performed.

In one deployment scenario, massive base stations, especially micro base stations, are deployed in a dense manner. In this scenario, interference between cells administrated by each mirco base station is rather severe, especially as for synchronization information, so that it is even more difficult for the UE to read the common control channel or even impossible to acquire, including PBCH and a control channel for scheduling the SIB.

In order to solve the problem of detecting the common control channel in an interference restricted scenario, one direct solution is to perform inter-cell interference coordination, that is, neighboring cells respectively transmit the common control channels of their respective cells with orthogonal resources, such as PBCH, SIB and so on, and the orthogonal resources mentioned above can be at least one of time domain, frequency domain, codeword domain and spatial domain. However, the PBCH carries the downlink carrier bandwidth based on the current design of the system, that is, before the PBCH is detected, the UE has no idea about the downlink carrier bandwidth of the current carrier, and therefore, the interference coordination only can be performed within a predefined bandwidth, for example, the predefined bandwidth in the current long term evolution (LTE) system is the frequency domain width of six resource blocks in the carrier center. It can be seen that such interference coordination has a rather low degree of freedom, and the above problems of detecting the common control channel cannot be completely solved, especially in a scenario where the cells are deployed in a dense manner.

SUMMARY

Embodiments of the present invention provide a detecting method, a transmitting method and an apparatus for a common control channel, which can coordinate inter-cell interference of the common control channel, and improve a detection performance of the common control channel.

A first aspect provides a method for detecting a common control channel, including: determining a candidate resource set within virtual downlink resources of a current cell, where the candidate resource set includes at least one candidate resource carrying a common control channel of the current cell; and performing a detection on at least one candidate resource in the candidate resource set, so as to acquire the common control channel of the current cell.

In a first possible implementation by combining the first aspect, before the determining the candidate resource set within the virtual downlink resources of the current cell, the method further includes: acquiring frequency domain position information of the current cell, where the frequency domain position information includes a central frequency point position of the current cell and/or a frequency domain central resource position of the current cell; and determining the virtual downlink resources according to the frequency domain position information.

In a second possible implementation by combining the first aspect or the first possible implementation of the first aspect, and more specifically, the candidate resource set includes at least one candidate resource subset, and each candidate resource subset in the candidate resource set corresponds to one kind of actual downlink resource bandwidth of the current cell.

In a third possible implementation by combining the second possible implementation of the first aspect, and more specifically, a resource unit of the candidate resource in the candidate resource subset has a maximum frequency domain width less than or equal to half of the actual downlink resource bandwidth corresponding to the candidate resource subset, and the resource unit is a physical block PRB, a PRB pair, a control channel element or a resource element group, which consist of the candidate resource in the candidate resource subset.

In a fourth possible implementation by combining the third possible implementation of the first aspect, one of the candidate resources in the candidate resource subset is a frequency domain shift copy of the other candidate resource in the candidate resource subset.

In a fifth possible implementation by combining any one possible implementation of the second possible implementation of the first aspect to the fourth possible implementation of the first aspect, before the performing the detection on at least one candidate resource in the candidate resource set, so as to acquire the common control channel of the current cell, the method further includes: acquiring a physical cell identifier (PCI) of the current cell; determining at least one first candidate resource respectively in each candidate resource subset in the candidate resource set according to the PCI. The performing the detection on at least one candidate resource in the candidate resource set, so as to acquire the common control channel of the current cell, and more specifically, performing the detection on at least one first candidate resource, so as to acquire the common control channel of the current cell.

In a sixth possible implementation by combining the first aspect or the first possible implementation of the first aspect, the method further includes: acquiring a PCI of the current cell. The performing the detection on at least one candidate resource in the candidate resource set, so as to acquire the common control channel of the current cell, and more specifically, performing the detection on at least one candidate resource in the candidate resource set according to the PCI, so as to acquire the common control channel of the current cell.

In a seventh possible implementation by combining the first aspect or the first possible implementation of the first aspect, before the performing the detection on at least one candidate resource in the candidate resource set, so as to acquire the common control channel of the current cell, the method further includes: acquiring a PCI of the current cell; determining at least one first candidate resource from the candidate resource set according to the PCI, where a number of the at least one first candidate resources is less than or equal to a number of candidate resources in the candidate resource set; performing the detection on at least one candidate resource in the candidate resource set, so as to acquire the common control channel of the current cell, and more specifically, performing the detection on the at least one first candidate resource, so as to acquire the common control channel of the current cell.

In an eighth possible implementation by combining the first aspect or any one possible implementation of the first possible implementation of the first aspect to the seventh possible implementation of the first aspect, the method further includes: determining, according to position information of a common control channel detected resource, an actual downlink resource bandwidth of the current cell, wherein the common control channel detected resource is a candidate resource detecting the common control channel of the current cell; or determining, according to downlink resource bandwidth indication information carried by the common control channel of the current cell, the actual downlink resource bandwidth of the current cell.

In a ninth possible implementation by combining the eighth possible implementation of the first aspect, the determining, according to position information of a common control channel detected resource, the actual downlink resource bandwidth of the current cell, and more specifically, determining, according to a common control channel detected resource of a cell to be determined, a first downlink resource bandwidth; and if a positional relationship between the common control channel detected resource of the cell to be determined and the current cell conforms to a positional relationship indicated by resource position indication information carried by a common control channel of the cell to be determined, determining that the first downlink resource bandwidth is the actual downlink resource bandwidth of the current cell, wherein the resource position indication information carried by the common control channel of the cell to be determined indicates a positional relationship between the common control channel detected resource of the cell to be determined and the cell to be determined.

In a tenth possible implementation by combining the eighth possible implementation of the first aspect, the determining, according to downlink resource bandwidth indication information carried by the common control channel of the current cell, the actual downlink resource bandwidth of the current cell, and more specifically, determining, according to downlink resource bandwidth indication information carried by a common control channel of the cell to be determined, a second downlink resource bandwidth; if a common control channel detected resource of the cell to be determined is within a frequency resource range of an undetermined downlink resource of the current cell, determining that the second downlink resource bandwidth is the actual downlink resource bandwidth of the current cell, wherein the undetermined downlink resource of the current cell is a cell downlink resource when the second downlink resource bandwidth is a bandwidth of the current cell.

In an eleventh possible implementation by combining the first aspect or any one possible implementation of the first possible implementation of the first aspect to the tenth possible implementation of the first aspect, the method further includes: determining, according to position information of a common control channel detected resource, an actual resource of a common search space of the current cell, wherein the common control channel detected resource is a candidate resource detecting the common control channel of the current cell, and the actual resource is a resource actually used by the common search space of the current cell.

In a twelfth possible implementation by combining the eleventh possible implementation of the first aspect, the determining, according to the position information of the common control channel detected resource, the actual resource of the common search space of the current cell, and more specifically, acquiring, according to the position information of the common control channel detected resource, a candidate resource where the common control channel detected resource is located; determining, according to corresponding relationship between candidate resources of the common search space and candidate resources of the common control channel, that a candidate resource of the common search space corresponding to the candidate resource where the common control channel detected resource is located is the actual resource of the common search space, wherein the candidate resources of the common search space are candidate resources in the candidate resource set or candidate resources in a first common search space candidate resource set corresponding to the candidate resource set.

In a thirteenth possible implementation by combining the first aspect or any one possible implementation of the first possible implementation of the first aspect to the twelfth possible implementation of the first aspect, the method further includes: determining, according to common search space indication information carried by the common control channel of the current cell, an actual resource of a common search space of the current cell, wherein the actual resource is a resource actually used by the common search space of the current cell.

In a fourteenth possible implementation by combining the thirteenth possible implementation of the first aspect, the determining, according to the common search space indication information carried by the common control channel of the current cell, the actual resource of the common search space of the current cell, and more specifically, determining that all or a part of candidate resource in the candidate resources indicated by the common search space indication information is the actual resource of the common search space of the current cell, wherein the candidate resources indicated by the common search space indication information are candidate resources in the candidate resource set or candidate resources in a first common search space candidate resource set corresponding to the candidate resource set.

In a fifteenth possible implementation by combining the thirteenth possible implementation of the first aspect or the fourteenth possible implementation of the first aspect, the determining, according to the common search space indication information carried by the common control channel of the current cell, the actual resource of the common search space of the current cell, and more specifically, determining, according to the position information of the common control channel detected resource and the common search space indication information carried by the common control channel of the current cell, the actual resource of the common search space of the current cell, wherein the common control channel detected resource is a candidate resource detecting the common control channel of the current cell.

In a sixteenth possible implementation by combining the fifteenth possible implementation of the first aspect, the determining, according to the position information of the common control channel detected resource and the common search space indication information carried by the common control channel of the current cell, the actual resource of the common search space of the current cell, and more specifically, determining, according to the position information of the common control channel detected resource, a second common search space candidate resource set of the current cell, wherein the second common search space candidate resource set is a subset of the candidate resource set or a subset of the first common search space candidate resource set corresponding to the candidate resource set; and determining, according to the common search space indication information carried by the common control channel of the current cell and the second common search space candidate resource set, the actual resource of the common search space of the current cell.

In a seventeenth possible implementation by combining the first aspect or any one possible implementation of the first possible implementation of the first aspect to the fourth possible implementation of the first aspect, before the performing the detection on at least one candidate resource in the candidate resource set, so as to acquire the common control channel of the current cell, the method further includes: acquiring a PCI of the current cell. The method further includes: determining, according to the PCI, all or a part of a candidate resource in the candidate resource set is a candidate resource of a common search space of the current cell.

In an eighteenth possible implementation by combining the seventeenth possible implementation of the first aspect, the performing the detection on at least one candidate resource in the candidate resource set, so as to acquire the common control channel of the current cell, specifically including: if the candidate resource of the common search space of the current cell is a part of the candidate resource in the candidate resource set, performing the detection on the candidate resource other than the candidate resource of the common search space of the current cell in the candidate resource set, so as to acquire the common control channel of the current cell.

In a nineteenth possible implementation by combining the first aspect or any one possible implementation of the first possible implementation of the first aspect to the fourth possible implementation of the first aspect, before the performing the detection on at least one candidate resource in the candidate resource set, so as to acquire the common control channel of the current cell, the method further includes: acquiring a PCI of the current cell. The method further includes: determining, according to the PCI of the current cell and/or position information of a common control channel detected resource, a first part of resource of a common search space of the current cell; determining, according to common search space indication information carried by the common control channel of the current cell, a second part of resource of the common search space of the current cell; wherein an actual resource of a common search space of the current cell includes the first part of resource and the second part of resource.

In a twentieth possible implementation by combining the first aspect or any one possible implementation of the first possible implementation of the first aspect to the nineteenth possible implementation of the first aspect, specifically including: a bandwidth of the virtual downlink resources is greater than or equal to an actual downlink resource bandwidth of the current cell; and/or the bandwidth of the virtual downlink resources is greater than or equal to a predefined downlink resource bandwidth.

In a twenty first possible implementation by combining the first aspect or any one possible implementation of the first possible implementation of the first aspect to the twentieth possible implementation of the first aspect, specifically including: the common control channel carries at least one of the following information: actual downlink resource bandwidth information of the current cell, system radio frame number, antenna port number, antenna port numbers, physical hybrid automatic repeat request indicator channel (PHICH) configuration information, enhanced physical hybrid automatic repeat request indicator channel (ePHICH) configuration information, scheduling information of a first system information block (SIB1) in a system information block (SIB) and configuration information of the SIB other than the SIB1.

In a twenty second possible implementation by combining the first aspect or any one possible implementation of the first possible implementation of the first aspect to the twenty first possible implementation of the first aspect, the performing the detection on at least one candidate resource in the candidate resource set, so as to acquire the common control channel of the current cell, and more specifically, detecting, in a first subframe, a first common control channel of the current cell on a third candidate resource of the at least one candidate resource, and detecting, in a second subframe, a second common control channel of the current cell on a fourth candidate resource of the at least one candidate resource, wherein the first subframe and the second subframe are two subframes with different times, the third candidate resource and the fourth candidate resource have different frequency resource positions, and the first common control channel and the second common control channel carry a same original bit information.

A second aspect provides a method for transmitting a common control channel, including: selecting at least one first resource from a candidate resource set of a cell; and transmitting a common control channel of the cell on the at least one first resource.

In a first possible implementation by combining the second aspect, the method further includes: determining the candidate resource set in an actual downlink resources of the cell.

In a second possible implementation by combining the second aspect or the first possible implementation of the second aspect, the method further includes: determining at least one first candidate resource from the candidate resource set according to a physical cell identifier PCI of the cell, wherein a number of the at least one first candidate resource is less than or equal to a number of candidate resources in the candidate resource set; the selecting at least one first resource from the candidate resource set of the cell, includes: selecting the at least one first resource from the at least one first candidate resource.

In a third possible implementation by combining the second aspect or the first possible implementation of the second aspect, and more specifically, the candidate resource set includes at least one candidate resource subset, and each candidate resource subset of the candidate resource set corresponds to one kind of actual downlink resource bandwidth of the cell.

In a fourth possible implementation by combining the third possible implementation of the second aspect, and more specifically, a resource unit of the candidate resource in the candidate resource set has a maximum frequency domain width less than or equal to half of the actual downlink resource bandwidth corresponding to the candidate resource in the candidate resource set, and the resource unit is a physical block PRB, a PRB pair, a control channel element or a resource element group, which consist of the candidate resource.

In a fifth possible implementation by combining the fourth possible implementation of the second aspect, and more specifically, one of candidate resources in the candidate resource subset is a frequency domain shift copy of the other candidate resource in the candidate resource subset.

In a sixth possible implementation by combining the fifth possible implementation of the second aspect, and more specifically, one of the candidate resources in the candidate resource subset is a frequency domain shift copy of the other candidate resources in the candidate resource subset.

In a seventh possible implementation by combining any one possible implementation of the fourth possible implementation of the second aspect to the sixth possible implementation of the second aspect, before the selecting at least one first resource from the candidate resource set of the cell, the method further including: determining, according to the actual downlink resource bandwidth of the cell, a first candidate resource subset corresponding to the actual downlink resource bandwidth of the cell in the candidate resource set. The selecting at least one first resource from the candidate resource set of the cell, specifically including: selecting the at least one first resource from the first candidate resource subset.

In an eighth possible implementation by combining the second aspect or any one possible implementation of the first possible implementation of the second aspect to the seventh possible implementation of the second aspect, and more specifically, the common control channel of the cell further carries downlink resource bandwidth indication information for indicating actual downlink resource bandwidth of the cell.

In a ninth possible implementation by combining the second aspect or any one possible implementation of the first possible implementation of the second aspect to the eighth possible implementation of the second aspect, and more specifically, the common control channel of the cell further carries resource position indication information for indicating a positional relationship between the candidate resource which transmits the common control channel of the cell and the cell.

In a tenth possible implementation by combining the second aspect or any one possible implementation of the first possible implementation of the second aspect to the ninth possible implementation of the second aspect, and more specifically, position information of the at least one first resource is further used to indicate an actual resource of a common search space of the cell for a UE.

In an eleventh possible implementation by combining the second aspect or any one possible implementation of the first possible implementation of the second aspect to the tenth possible implementation of the second aspect, and more specifically, the common control channel of the cell further carries a first common search space indication information for indicating the actual resource of the common search space of the cell.

In a twelfth possible implementation by combining the eleventh possible implementation of the second aspect, and more specifically, the actual resource indicated by the first common search space indication information is all or a part of the candidate resource in the candidate resource set; or the actual resource indicated by the first common search space indication information is all or a part of a candidate resource of a first common search space candidate resource set corresponding to the candidate resource set.

In a thirteenth possible implementation by combining the second aspect or any one possible implementation of the first possible implementation of the second aspect to the tenth possible implementation of the second aspect, and more specifically, the position information of the at least one first resource is further used to indicate a candidate resource of the common search space of the cell for the UE; the common control channel of the cell further carries a second common search space indication information for indicating a position of the actual resource of the common search space of the cell in the candidate resource of the common search space.

In a fourteenth possible implementation by combining the second aspect or any one possible implementation of the first possible implementation of the second aspect to the tenth possible implementation of the second aspect, and more specifically, the position information of the at least one first resource is further used to indicate a second common search space candidate resource set of the common search space of the cell for the UE, and the second common search space candidate resource set is a subset of the candidate resource set or a subset of a first common search space candidate resource set corresponding to the candidate resource set. The common control channel of the cell further carries a third common search space indication information for indicating a position of the actual resource of the common search space of the cell in the second common search space candidate resource set.

In a fifteenth possible implementation by combining the second aspect or any one possible implementation of the first possible implementation of the second aspect to the tenth possible implementation of the second aspect, and more specifically, the position information of the at least one first resource is further used to indicate a first part of resource of the common search space of the cell for the UE. The common control channel of the current cell further carries a fourth common search space indication information for indicating a second part of resources of the common search space of the current cell. The actual resource of the common search space of the current cell includes the first part of resource and the second part of resource.

In a sixteenth possible implementation by combining the second aspect or any one possible implementation of the first possible implementation of the second aspect to the fifteenth possible implementation of the second aspect, the selecting at least one first resource from the candidate resource set of the cell, specifically including: if the candidate resource of the common search space of the cell is a part of candidate resource in the candidate resource set, selecting at least one first resource from candidate resources other than resource of the common search space of the cell in the candidate resource set.

In a seventeenth possible implementation by combining the second aspect or any one possible implementation of the first possible implementation of the second aspect to the sixteenth possible implementation of the second aspect, and more specifically, the common control channel carries at least one of the following information: actual downlink resource bandwidth information of the cell, system radio frame number, antenna port number, antenna port numbers, physical hybrid automatic repeat request indicator channel PHICH configuration information, enhanced physical hybrid automatic repeat request indicator channel ePHICH configuration information, scheduling information of a first system information block SIB1 in a system information block SIB and configuration information of the SIB other than the SIB1.

In an eighteenth possible implementation by combining the second aspect or any one possible implementation of the first possible implementation of the second aspect to the seventeenth possible implementation of the second aspect, the transmitting the common control channel of the cell on the at least one first resource, specifically including: transmitting, in a first subframe, a first common control channel of the cell on a third candidate resource in the at least one first resource, and transmitting, in a second subframe, a second common control channel of the cell on a fourth candidate resource in the at least one first resource, wherein the first subframe and the second subframe are subframes with two different times, the third candidate resource and the fourth candidate resource have different frequency resource positions, and the first common control channel and the second common control channel carry a same original bit information.

A third aspect provides a user equipment includes: a determination unit, configured to determine a candidate resource set within virtual downlink resources of a current cell, wherein the candidate resource set includes at least one candidate resource carrying a common control channel of the current cell; a detection unit, configured to perform a detection on at least one candidate resource in the candidate resource set, so as to acquire the common control channel of the current cell.

In a first possible implementation by combining the third aspect, further includes: a first acquisition unit, configured to acquire frequency domain position information of the current cell, wherein the frequency domain position information includes a central frequency point position of the current cell and/or a frequency domain central resource position of the current cell. The determination unit is further configured to determine the virtual downlink resources according to the frequency domain position information.

In a second possible implementation by combining the third aspect or the first possible implementation of the third aspect, and more specifically, the candidate resource set includes at least one candidate resource subset, and each candidate resource subset in the candidate resource set corresponds to one kind of actual downlink resource bandwidth of the current cell.

In a third possible implementation by combining the second possible implementation of the third aspect, and more specifically, a resource unit of the candidate resource in the candidate resource subset has a maximum frequency domain width less than or equal to half of the actual downlink resource bandwidth corresponding to the candidate resource subset, and the resource unit is a physical block PRB, a PRB pair, a control channel element or a resource element group, which consist of the candidate resource in the candidate resource subset.

In a fourth possible implementation by combining the third possible implementation of the third aspect, and more specifically, one of candidate resources in the candidate resource subset is a frequency domain shift copy of the other candidate resource in the candidate resource subset.

In a fifth possible implementation by combining any one possible implementation of the second possible implementation of the third aspect to the fourth possible implementation of the third aspect, further includes: a second acquisition unit, configured to acquire a physical cell identifier PCI of the current cell; the determination unit is further configured to determine at least one first candidate resource respectively in each candidate resource subset in the candidate resource set according to the PCI; the detection unit is specifically configured to perform the detection on the at least one first candidate resource, so as to acquire the common control channel of the current cell.

In a sixth possible implementation by combining the third aspect or the first possible implementation of the third aspect, further includes: a second acquisition unit, configured to acquire a PCI of the current cell. The detection unit is further specifically configured to perform the detection on at least one candidate resource in the candidate resource set according to the PCI, so as to acquire the common control channel of the current cell.

In a seventh possible implementation by combining the third aspect or the first possible implementation of the third aspect, further includes: a second acquisition unit, configured to acquire a PCI of the current cell; the determination unit is specifically configured to determine at least one first candidate resource from the candidate resource set according to the PCI, and a number of the at least one first candidate resource is less than or equal to a number of candidate resources in the candidate resource set; the detection unit is specifically configured to perform the detection on the at least one first candidate resource, so as to acquire the common control channel of the current cell.

In an eighth possible implementation by combining the third aspect or any one possible implementation of the first possible implementation of the third aspect to the seventh possible implementation of the third aspect, and more specifically, the determination unit is further configured to determine, according to position information of a common control channel detected resource, the actual downlink resource bandwidth of the current cell, wherein the common control channel detected resource is a candidate resource detecting the common control channel of the current cell; or the determination unit is further configured to determine, according to downlink resource bandwidth indication information carried by the common control channel of the current cell, the actual downlink resource bandwidth of the current cell.

In a ninth possible implementation by combining the eighth possible implementation of the third aspect, and more specifically, the determination unit is specifically configured to determine, according to an common control channel detected resource of a cell to be determined, a first downlink resource bandwidth; and if a positional relationship between the common control channel detected resource of the cell to be determined and the current cell conforms to a positional relationship indicated by resource position indication information carried by a common control channel of the cell to be determined, the determination unit is further specifically configured to determine that the first downlink resource bandwidth is the actual downlink resource bandwidth of the current cell, wherein the resource position indication information carried by the common control channel of the cell to be determined indicates the positional relationship between the common control channel detected resource of the cell to be determined and the cell to be determined.

In a tenth possible implementation by combining the eighth possible implementation of the third aspect, and more specifically, the determination unit is further specifically configured to determine, according to downlink resource bandwidth indication information carried by a common control channel of the cell to be determined, a second downlink resource bandwidth; if a common control channel detected resource of the cell to be determined is within a frequency resource range of an undetermined downlink resource of the current cell, the determination unit is further specifically configured to determine that the second downlink resource bandwidth is the actual downlink resource bandwidth of the current cell, wherein the undetermined downlink resource of the current cell is a cell downlink resource when the second downlink resource bandwidth is a bandwidth of the current cell.

In an eleventh possible implementation by combining the third aspect or any one possible implementation of the first possible implementation of the third aspect to the tenth possible implementation of the third aspect, and more specifically, the determination unit is further specifically configured to determine, according to position information of a common control channel detected resource, an actual resource of a common search space of the current cell, wherein the common control channel detected resource is a candidate resource detecting the common control channel of the current cell, and the actual resource is a resource actually used by the common search space of the current cell.

In a twelfth possible implementation by combining the eleventh possible implementation of the third aspect, and more specifically, the determination unit is further specifically configured to acquire, according to the position information of the common control channel detected resource, a candidate resource where the common control channel detected resource is located and determine, and according to corresponding relationship between candidate resources of the common search space and candidate resources of the common control channel, that a candidate resource of the common search space corresponding to the candidate resource where the common control channel detected resource is located is the actual resource of the common search space, wherein the candidate resources of the common search space are candidate resources in the candidate resource set or candidate resources in a first common search space candidate resource set corresponding to the candidate resource set.

In a thirteenth possible implementation by combining the third aspect or any one possible implementation of the first possible implementation of the third aspect to the twelfth possible implementation of the third aspect, and more specifically, the determination unit is further configured to determine, according to common search space indication information carried by the common control channel of the current cell, an actual resource of a common search space of the current cell, wherein the actual resource is a resource actually used by the common search space of the current cell.

In a fourteenth possible implementation by combining the thirteenth possible implementation of the third aspect, and more specifically, the determination unit is further specifically configured to determine that all or a part of candidate resource in the candidate resources indicated by the common search space indication information is the actual resources of the common search space of the current cell, wherein the candidate resources indicated by the common search space indication information are candidate resources in the candidate resource set or candidate resources in a first common search space candidate resource set corresponding to the candidate resource set.

In a fifteenth possible implementation by combining the thirteenth possible implementation of the third aspect or the fourteenth possible implementation of the third aspect, and more specifically, the determination unit is further specifically configured to determine, according to the position information of the common control channel detected resource and the common search space indication information carried by the common control channel of the current cell, the actual resource of the common search space of the current cell, wherein the common control channel detected resource is a candidate resource detecting the common control channel of the current cell.

In a sixteenth possible implementation by combining the fifteenth possible implementation of the third aspect, and more specifically, the determination unit is further specifically configured to determine, according to the position information of the common control channel detected resource, a second common search space candidate resource set of the current cell, and determine, according to the common search space indication information carried by the common control channel of the current cell and the second common search space candidate resource set, the actual resource of the common search space of the current cell, wherein the second common search space candidate resource set is a subset of the candidate resource set or a subset of the first common search space candidate resource set corresponding to the candidate resource set.

In a seventeenth possible implementation by combining the third aspect or any one possible implementation of the first possible implementation of the third aspect to the fourth possible implementation of the third aspect, further includes: a second acquisition unit, configured to acquire a PCI of the current cell. The determination unit is further configured to determine, according to the PCI, all or a part of a candidate resource in the candidate resource set is a candidate resource of a common search space of the current cell.

In an eighteenth possible implementation by combining the seventeenth possible implementation of the third aspect, and more specifically, if the candidate resource of the common search space of the current cell is a part of the candidate resource in the candidate resource set, the determination unit is further specifically configured to perform the detection on the candidate resource other than the candidate resource of the common search space of the current cell in the candidate resource set, so as to acquire the common control channel of the current cell.

In a nineteenth possible implementation by combining the third aspect or any one possible implementation of the first possible implementation of the third aspect to the fourth possible implementation of the third aspect, further includes: a second acquisition unit, configured to acquire a PCI of the current cell. The determination unit is further specifically configured to determine, according to the PCI of the current cell and/or position information of a common control channel detected resource, a first part of resource of a common search space of the current cell, and determine, according to the common search space indication information carried by the common control channel of the current cell, a second part of resource of the common search space of the current cell. An actual resource of a common search space of the current cell includes the first part of resource and the second part of resource.

In a twentieth possible implementation by combining the third aspect or any one possible implementation of the first possible implementation of the third aspect to the nineteenth possible implementation of the third aspect, and more specifically, a bandwidth of the virtual downlink resources is greater than or equal to an actual downlink resource bandwidth of the current cell; and/or the bandwidth of the virtual downlink resources is greater than or equal to a predefined downlink resource bandwidth.

In a twenty first possible implementation by combining the third aspect or any one possible implementation of the first possible implementation of the third aspect to the twentieth possible implementation of the third aspect, and more specifically, the common control channel carries at least one of the following information: actual downlink resource bandwidth information of the current cell, system radio frame number, antenna port number, antenna port numbers, physical hybrid automatic repeat request indicator channel (PHICH) configuration information, enhanced physical hybrid automatic repeat request indicator channel (ePHICH) configuration information, scheduling information of a first system information block (SIB1) in a system information block (SIB) and configuration information of the SIB other than the SIB1.

In a twenty second possible implementation by combining the third aspect or any one possible implementation of the first possible implementation of the third aspect to the twenty first possible implementation of the third aspect, and more specifically, the detection unit is further specifically configured to detect, in a first subframe, a first common control channel of the current cell on a third candidate resource of the at least one candidate resource, and detect, in a second subframe, a second common control channel of the current cell on a fourth candidate resource of the at least one candidate resource, wherein the first subframe and the second subframe are two subframes with different times, the third candidate resource and the fourth candidate resource have different frequency resource positions, and the first common control channel and the second common control channel carry a same original bit information.

A fourth aspect provides a base station, including: a selection unit, configured to select at least one first resource from a candidate resource set of a cell; and a transmission unit, configured to transmit a common control channel of the cell on the at least one first resource.

In a first possible implementation by combining the fourth aspect, further includes: a determination unit, configured to determine the candidate resource set in an actual downlink resource of the cell.

In a second possible implementation by combining the fourth aspect or the first possible implementation of the fourth aspect, and more specifically, the determination unit is further configured to determine at least one first candidate resource from the candidate resource set according to a physical cell identifier (PCI) of the cell, wherein a number of the at least one first candidate resource is less than or equal to a number of candidate resources in the candidate resource set; the selection unit is further specifically configured to select the at least one first resource from the at least one first candidate resource.

In a third possible implementation by combining the fourth aspect or the first possible implementation of the fourth aspect, and more specifically, the candidate resource set includes at least one candidate resource subset, and each candidate resource subset of the candidate resource set corresponds to one kind of actual downlink resource bandwidth of the cell.

In a fourth possible implementation by combining the third possible implementation of the fourth aspect, and more specifically, a resource unit of the candidate resource in the candidate resource set has a maximum frequency domain width less than or equal to half of the actual downlink resource bandwidth corresponding to the candidate resource in the candidate resource set, and the resource unit is a physical block PRB, a PRB pair, a control channel element or a resource element group, which consist of the candidate resource.

In a fifth possible implementation by combining the fourth possible implementation of the fourth aspect, and more specifically, one of candidate resources in the candidate resource subset is a frequency domain shift copy of the other candidate resource in the candidate resource subset.

In a sixth possible implementation by combining the fifth possible implementation of the fourth aspect, and more specifically, one of the candidate resources in the candidate resource subset is a frequency domain shift copy of the other candidate resource in the candidate resource subset.

In a seventh possible implementation by combining any one possible implementation of the fourth possible implementation of the fourth aspect to the sixth possible implementation of the fourth aspect, and more specifically, the determination unit is further configured to determine, according to the actual downlink resource bandwidth of the cell, a first candidate resource subset corresponding to the actual downlink resource bandwidth of the cell in the candidate resource set; the selection unit is specifically configured to select the at least one first resource from the first candidate resource subset.

In an eighth possible implementation by combining the fourth aspect or any one possible implementation of the first possible implementation of the fourth aspect to the seventh possible implementation of the fourth aspect, and more specifically, the common control channel of the cell further carries downlink resource bandwidth indication information for indicating the actual downlink resource bandwidth of the cell.

In a ninth possible implementation by combining the fourth aspect or any one possible implementation of the first possible implementation of the fourth aspect to the eighth possible implementation of the fourth aspect, and more specifically, the common control channel of the cell further carries resource position indication information for indicating a positional relationship between the candidate resource which transmits the common control channel of the cell and the cell.

In a tenth possible implementation by combining the fourth aspect or any one possible implementation of the first possible implementation of the fourth aspect to the ninth possible implementation of the fourth aspect, and more specifically, position information of the at least one first resource is further used to indicate an actual resource of a common search space of the cell for a UE.

In an eleventh possible implementation by combining the fourth aspect or any one possible implementation of the first possible implementation of the fourth aspect to the tenth possible implementation of the fourth aspect, and more specifically, the common control channel of the cell further carries a first common search space indication information for indicating the actual resource of the common search space of the cell.

In a twelfth possible implementation by combining the eleventh possible implementation of the fourth aspect, and more specifically, the actual resource indicated by the first common search space indication information is all or a part of the candidate resource in the candidate resource set; or the actual resource indicated by the first common search space indication information is all or a part of a candidate resource of the first common search space candidate resource set corresponding to the candidate resource set.

In a thirteenth possible implementation by combining the fourth aspect or any one possible implementation of the first possible implementation of the fourth aspect to the tenth possible implementation of the fourth aspect, and more specifically, the position information of the at least one first resource is further used to indicate candidate resource of a common search space of the cell for the UE; the common control channel of the cell further carries a second common search space indication information for indicating a position of the actual resource of the common search space of the cell in the candidate resource of the common search space.

In a fourteenth possible implementation by combining the fourth aspect or any one possible implementation of the first possible implementation of the fourth aspect to the tenth possible implementation of the fourth aspect, and more specifically, the position information of the at least one first resource is further used to indicate a second common search space candidate resource set of the common search space of the cell for the UE, and the second common search space candidate resource set is a subset of the candidate resource set or a subset of a first common search space candidate resource set corresponding to the candidate resource set. The common control channel of the cell further carries a third common search space indication information for indicating a position of the actual resource of the common search space of the cell in the second common search space candidate resource set.

In a fifteenth possible implementation by combining the fourth aspect or any one possible implementation of the first possible implementation of the fourth aspect to the tenth possible implementation of the fourth aspect, and more specifically, the position information of the at least one first resource is further used to indicate a first part of resource of a common search space of the cell for the UE. The common control channel of the current cell further carries a fourth common search space indication information for indicating a second part of resource of the common search space of the current cell. The actual resource of the common search space of the current cell includes the first part of resource and the second part of resource.

In a sixteenth possible implementation by combining the fourth aspect or any one possible implementation of the first possible implementation of the fourth aspect to the fifteenth possible implementation of the fourth aspect, and more specifically, if the candidate resource of the common search space of the cell is a part of candidate resource in the candidate resource set, the selection unit is specifically configured to select at least one first resource from candidate resources other than resource of the common search space of the cell in the candidate resource set.

In a seventeenth possible implementation by combining the fourth aspect or any one possible implementation of the first possible implementation of the fourth aspect to the sixteenth possible implementation of the fourth aspect, and more specifically, the common control channel carries at least one of the following information: actual downlink resource bandwidth information of the cell, system radio frame number, antenna port number, antenna port numbers, physical hybrid automatic repeat request indicator channel (PHICH) configuration information, enhanced physical hybrid automatic repeat request indicator channel (ePHICH) configuration information, scheduling information of a first system information block (SIB1) in a system information block (SIB) and configuration information of the SIB other than the SIB1.

In an eighteenth possible implementation by combining the fourth aspect or any one possible implementation of the seventeenth possible implementation of the fourth aspect to the sixteenth possible implementation of the fourth aspect, and more specifically, the selection unit is specifically configured to transmit, in a first subframe, a first common control channel of the cell on a third candidate resource in the at least one first resource, and transmit, in a second subframe, a second common control channel of the cell on a fourth candidate resource in the at least one first resource, where the first subframe and the second subframe are two subframes with different times, the third candidate resource and the fourth candidate resource have different frequency resource positions, and the first common control channel and the second common control channel carry a same original bit information.

Embodiments of the present invention provide a detecting method, a transmitting method and an apparatus for a common control channel, and a selection range of resources for transmitting a common control channel is extended, so that inter-cell interference of the common control channel can be coordinated, and a detection performance of the common control channel can be improved.

BRIEF DESCRIPTION OF DRAWINGS

To illustrate the technical solutions in embodiments of the present invention more clearly, accompanying drawings needed in the description of the embodiments are illustrated briefly in the following. Apparently, the accompanying drawings in the following description show certain embodiments of the present invention, and persons skilled in the art can derive other drawings from them without creative efforts.

DESCRIPTION OF EMBODIMENTS

The technical solutions in the embodiments of the present invention are hereinafter described clearly with reference to the accompanying drawings in the embodiments of the present invention. Obviously, the embodiments described here are part of the embodiments of the invention and not all of the embodiments. All other embodiments, which can be derived by persons skilled in the art from the embodiments given herein without creative efforts, shall fall within the protection scope of the present invention.

The technical solutions of the present invention are applicable to various communication systems, such as global system of mobile communication (GSM), code division multiple access (CDMA) system, wideband code division multiple access (WCDMA), general packet radio service (GPRS), long term evolution (LTE), etc.

A user equipment (UE) also can be called a mobile terminal, a mobile user equipment and so on, which can communicate with one or more core networks via a wireless access network (such as, RAN, Radio Access Network), and the user equipment can be a mobile terminal, such as a mobile phone (or a "cellular" phone) and a computer with a mobile terminal, and thus can be, for example, portable, pocket, hand-held, computer-included, or car-mounted mobile devices which communicate voice and/or data with a radio access network.

The base station can be a base station (BTS, Base Transceiver Station) in GSM or CDMA, or a base station (NodeB) in WCDMA, or an evolved Node B (eNB or e-NodeB, evolutional Node B) in LTE, and the present invention is not limited thereto, for ease of description only, the embodiments below will be described taking an eNB as an example.

Figure 1:
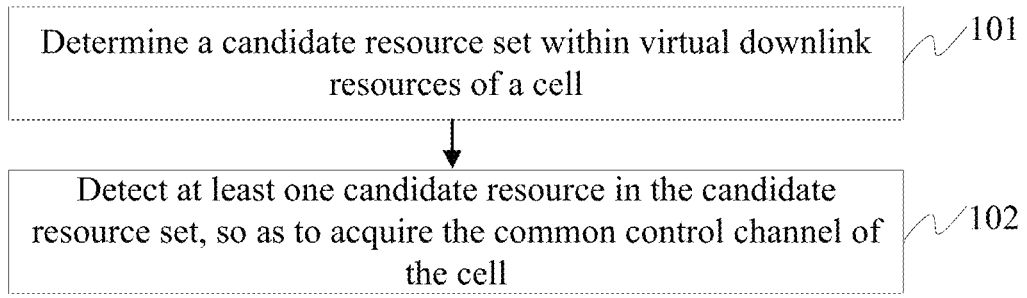
FIG. 1 is a flow chart of a method for detecting a common control channel according to an embodiment of the present invention.

FIG. 1 is a flow chart of a method for detecting a common control channel according to an embodiment of the present invention, and the method in FIG. 1 is implemented by a UE.

101, determine a candidate resource set within virtual downlink resources of a current cell. Wherein, the candidate resource set can include at least one candidate resource carrying a common control channel of the current cell.

The virtual downlink resources are frequency resources of the UE to detect the common control channel of the current cell, in other words, the UE detects the common control channel of the current cell within a range of frequency resources of the virtual downlink resources. The virtual downlink resources include at least a part of actual downlink resources of the current cell. The candidate resource set is a set of at least one candidate resource in the virtual downlink resources, and the candidate resource is a downlink resource possibly selected by the common control channel of the current cell. The candidate resource set includes at least one candidate resource of a common control channel of the current cell.

The common control channel according to embodiments of the present invention is configured to carry information carried by a physical broadcasting channel (Physical Broadcasting Channel, PBCH) and all or a part of information carried by a control channel of a scheduling system information block (SIB). The specific manner of the common control channel is not limited in embodiments of the present invention, for example, the common control channel can utilize the PBCH and the SIB, or utilize an enhanced physical broadcasting channel (ePBCH), or utilize an enhanced physical downlink control channel, or utilize other physical channels.

102, perform a detection on at least one candidate resource in the candidate resource set, so as to acquire the common control channel of the current cell.

In the embodiments of the present invention, the candidate resource set within the virtual downlink resources of the current cell is acquired, and the detection is performed in the candidate resource set so as to acquire the common control channel of the cell, so that inter-cell interference of the common control channel can be coordinated, and a detection performance of the common control channel can be improved.

The "cell" mentioned in embodiments of the present invention can correspond to a carrier for carrying a common control channel. In an LTE single carrier system, the only one carrier corresponds to one PCI, so it can be interpreted as or equivalent to one cell; in an LTE multi-carrier system, each carrier corresponds to one PCI, and PCIs of multiple carriers are separately configured, which can be the same or different, and thus different carriers also can be interpreted as different cells. Therefore, the cell and the carrier are not distinguished in embodiments of the present invention. For ease of description, the following is described in terms of the cell. In addition, the "current cells" mentioned in embodiments of the present invention all refer to cells to which the UE is ready to access or reside.

Figure 2:
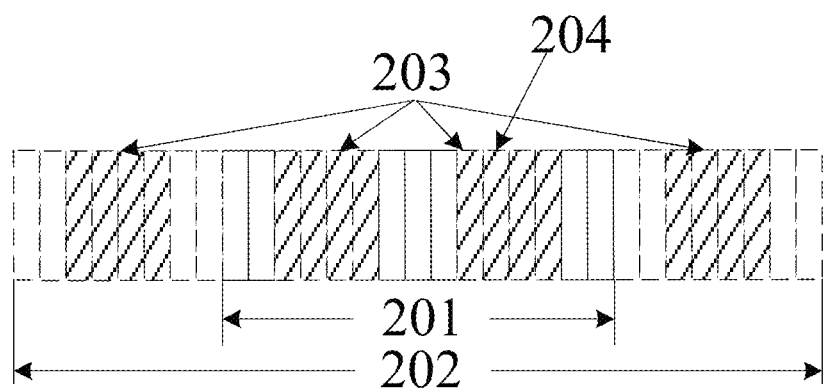
FIG. 2 is a schematic diagram of a relationship between virtual downlink resources and actual downlink resources according to an embodiment of the present invention.

FIG. 2 is a schematic diagram of a relationship between virtual downlink resources and actual downlink resources of a current cell of a UE according to an embodiment of the present invention. Arrows 201 refer to actual downlink resources of the current cell. Arrows 202 refer to virtual downlink resources. Arrows 203 refer to candidate resources in the virtual downlink resources. An arrow 204 indicates resources used when the current cell transmits a common control channel.

As shown in FIG. 2, a bandwidth of the virtual downlink resources can be greater than or equal to a bandwidth of the actual downlink resources of the current cell. For example, the bandwidth of the actual downlink resources is 5 MHz, and the bandwidth of the virtual downlink resources can be predefined as 20 MHz or 10 MHz. The bandwidth of the virtual downlink resources can also be greater than or equal to a predefined bandwidth of frequency domain resources, for example, it is greater than or equal to a frequency domain width of six physical resource block pairs (PRB Pair). For example, the bandwidth of the virtual downlink resources can be predefined as 20 MHz or 10 MHz. In this way, when the actual bandwidth is greater than six PRB pairs, larger degree of freedom of the interference coordination can be guaranteed. Therefore, the bandwidth of the virtual downlink resources can be interpreted to be different from the actual downlink resource bandwidth of the current cell, for example, the bandwidth of the virtual downlink resources can be greater than the actual downlink resource bandwidth of the current cell; or, in some scenario, for example, the bandwidth of the virtual downlink resources is 10 MHz, but 20 MHz of the bandwidth of the actual downlink resources is also possible; or, the bandwidth of the actual downlink resources can just be equal to the bandwidth of the virtual downlink resources; or the bandwidth of the virtual downlink resources can be a frequency domain width of six PRBs at a predefined frequency center.

Optionally, before the determining the candidate resource set within the virtual downlink resources of the current cell, the method further includes: acquire frequency domain position information of the current cell, and determine the virtual downlink resources according to the frequency domain position information. The frequency domain position information includes a central frequency point position of the current cell and/or a frequency domain central resource position of the current cell. One possible determining manner is that, the virtual downlink resources are symmetrical and centered on the frequency domain resources indicated by the frequency domain position information or the central frequency point position.

Optionally, before the determining the candidate resource set within the virtual downlink resources of the current cell in step 101, a PCI of the current cell also can be acquired. The UE can acquire the PCI of the current cell by detecting a synchronization signal. After detecting the synchronization signal, the UE can determine the PCI of the current cell according to PSS and SSS. At this point, in step 102, the common control channel of the current cell can be detected on at least one candidate resource in the candidate resource set according to the PCI. Optionally, as another embodiment, the UE can descramble and decode demodulated information on the candidate resource in the candidate resource set according to the PCI. If the descrambling and decoding are successful, it indicates that the information detected on the candidate resource belongs to the common control channel of the current cell.

Further, before the step 102, the PCI of the current cell also can be acquired, and at least one first candidate resource is determined from the candidate resource set according to the PCI, where the number of the at least one first candidate resource is less than or equal to the number of the candidate resources in the candidate resource set. At this point, in the step 102, the detection is performed on at least one first candidate resource so as to acquire the common control channel of the current cell, and the method for acquiring PCI of the current cell by the UE is similar to the method above, after detecting the synchronization signal, the UE can determine the PCI of the current cell according to PSS and SSS. Optionally, as another embodiment, the UE determines one or more first candidate resources from a plurality of candidate resources according to the PCI, and the one or more first candidate resources are resources of the current cell, which are likely to transmit the common control channel. One possible determining method is to perform a modulus on the total number of the candidate resources in the candidate resource set with the PCI serial number of the current cell, and the obtained remainder is a candidate resource label of the common control channel transmitted by the current cell. Of course, the embodiments of the present invention also can use other methods for determining the first candidate resource according to the PCI. For example, the first candidate resource also can be determined according to a subframe label. For example, there are ten subframe labels 1 to 10 in total, if the UE detects the common control channel on the i-th (i is a natural number less than or equal to 10) subframe, the specific label of the first candidate resource in the candidate resource set can be determined according to the i.

Optionally, the candidate resource set includes at least one candidate resource subset. Each candidate resource subset in the candidate resource set corresponds to one kind of actual downlink resource bandwidth of the current cell. The candidate resource subset can be determined by pre-configuration or pre-negotiation, or the candidate resource subset can be determined by subset division of the candidate resource set through the PCI, and embodiments of the present invention are not limited thereto.

Optionally, as another embodiment, the current cell can have two kinds of actual downlink resource bandwidths, that is, a first actual downlink resource bandwidth and a second actual downlink resource bandwidth. Correspondingly, the candidate resource set includes a first candidate resource subset and a second candidate resource subset, each of which includes at least one candidate resource, and the candidate resource of the first candidate resource subset corresponds to the first actual downlink resource bandwidth, and the candidate resource of the second candidate resource subset corresponds to the second actual downlink resource bandwidth. When the UE detects the common control channel transmitted by the current cell in the candidate resource in the first candidate resource subset, it can be determined that the bandwidth of the current cell is the first actual downlink resource bandwidth; when the UE detects the common control channel transmitted by the current cell in the candidate resource in the second candidate resource subset, it can be determined that the bandwidth of the current cell is the second actual downlink resource bandwidth.

Optionally, the same candidate resource can be included in different candidate resource subsets. For example, a certain candidate resource can both belong to the first candidate resource subset and belong to the second candidate resource subset. In this way, the times of blind detection by the UE can be reduced. At this point, the actual downlink bandwidth of the current cell can be determined by combining indication information of the downlink resource bandwidth.

Further, a resource unit of the candidate resources in the candidate resource set has a maximum frequency domain width which is less than or equal to half of the actual downlink resource bandwidth corresponding to the candidate resources, and the resource unit can be a physical resource block (PRB), a PRB pair, a control channel element or a resource element group, which consist of the candidate resource in the candidate resource set. For example, if one candidate resource occupies two control channel elements, then the resource unit can be a control channel element.

Figure 3:
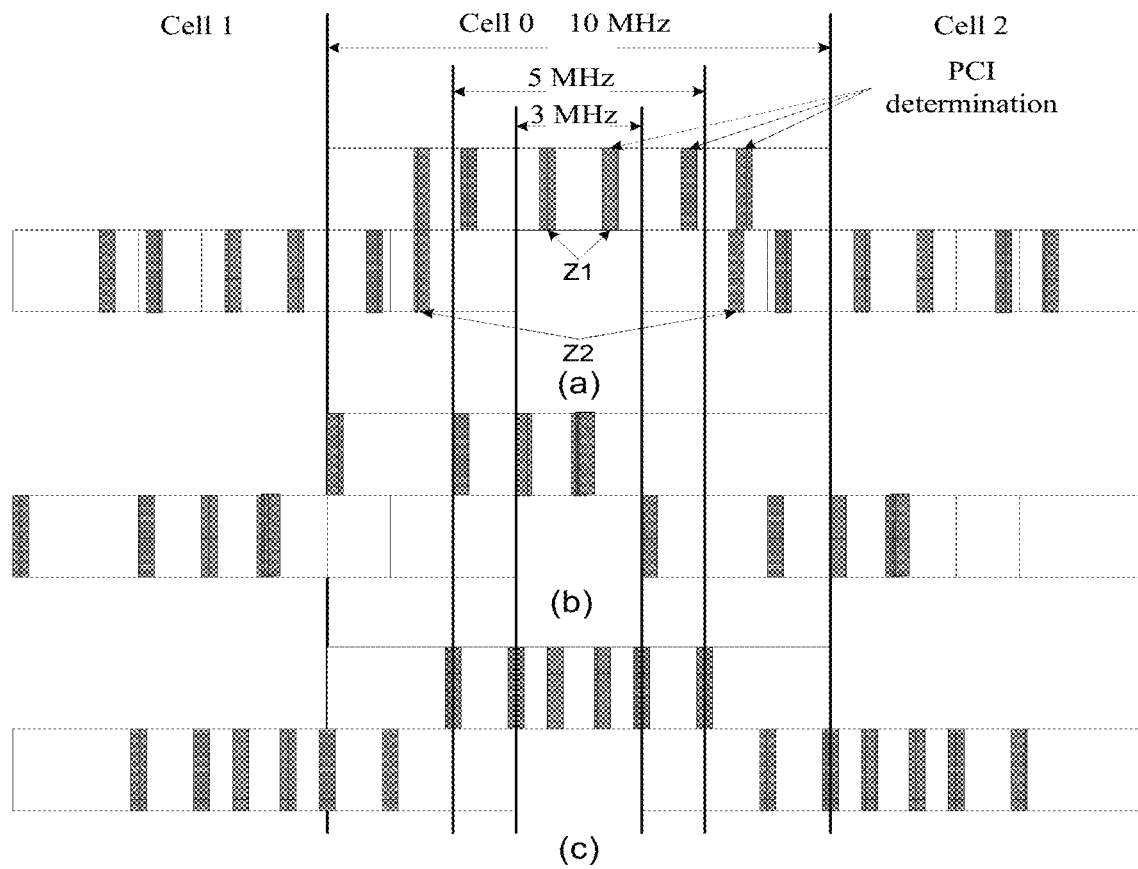
FIG. 3 is a schematic diagram of candidate resources of cells with the same PCI according to an embodiment of the present invention.

Further, one of the candidate resources in the candidate resource subset is a frequency domain shift copy of the other candidate resource in the candidate resource subset. FIG. 3 is a schematic diagram of candidate resources of cells with the same PCI according to an embodiment of the present invention. FIGS. 3 (a), (b) and (c) are three sets of different solutions for candidate resources, the bottom left corner of each set is a schematic diagram of candidate resources of cell 1, the middle on the top is a schematic diagram of candidate resources of cell 0, and the bottom right corner is a schematic diagram of candidate resources of cell 2. For purposes of explanation, it is assumed that one candidate resource consists of two PRB pairs, that is, the resource unit corresponds to the PRB pair, but the manner of forming the candidate resources is not limited in the embodiments of the present invention. As shown in FIG. 3, it is assumed that three actual downlink resource bandwidths are 3 MHz, 5 MHz and 10 MHz respectively, and other cases are similar thereto. It is assumed that the actual downlink resource bandwidth of cell 0 is 3 MHz, cell 1 and cell 2, which are adjacent to cell 0 to the left and right respectively, both are 10 MHz, and the three cells have the same PCI, that is, it is assumed that the three cells are deployed in one geographical position.

FIG. 3 shows the candidate resource corresponding to each actual downlink resource bandwidth, and it can be seen from FIG. 3(a) that, the candidate resources corresponding to an actual bandwidth of 10 MHz within the virtual downlink bandwidth of cell 0 are overlapped with the candidate resources, which actually transmit the common control channel, of cell 1 and cell 2 (a candidate resource position pointed to by "Z2" in FIG. 3(a)), which may cause a problem of fuzzy bandwidth detection. Specifically, a UE trying to detect the common control channel of cell 0 may detect a common control channel of 10 MHz on the candidate resources of cell 1 or cell 2, which may cause the UE to mistake the actual bandwidth of cell 0 for 10 MHz, and cause fuzzy bandwidth detection. The problem of fuzzy bandwidth detection can be circumvented by a method for allocating candidate resources in FIG. 3(b) and FIG. 3(c).

As shown in FIG. 3(b), the frequency domain width between two PRB pairs in each candidate resource is half of the actual downlink resource bandwidth corresponding to the candidate resource, and a plurality of candidate resources corresponding to the actual downlink resource bandwidth are frequency domain shift copies of each other. FIG. 3(c) shows a case after shift of FIG. 3(b). It can be seen that, neither a case of candidate resource overlapping shown in FIG. 3(a) nor the problem of fuzzy bandwidth detection will occur.

Further, before the step 102, the PCI of the current cell is acquired; at least one first candidate resource is determined respectively in each candidate resource subset in the candidate resource set according to the PCI. At this point, in step 102, the detection is performed on the at least one first candidate resource, so as to acquire the common control channel of the current cell. It is assumed that the current cell can select to use two actual downlink resource bandwidths, that is, a first actual downlink resource bandwidth and a second actual downlink resource bandwidth, and the candidate resource set includes a first candidate resource subset and a second candidate resource subset, which respectively correspond to the first actual downlink resource bandwidth and the second actual downlink resource bandwidth. After the PCI of the current cell is acquired by detecting the synchronization signal, at least one first candidate resource can be determined respectively from the first candidate resource subset and the second candidate resource subset according to the PCI of the current cell, and the common control channel of the current cell is detected on the first candidate resource respectively determined by the two candidate resource subsets.

In an optional solution, one first candidate resource is determined in each candidate resource subset. In another embodiment, for example, there are six actual downlink resource bandwidths, six corresponding candidate resources are selected respectively according to the PCI for actual detection of common control channel, so it is not necessary to perform blind detection on all the candidate resources in the candidate resource set, and the times of blind detection by the UE can be reduced. Specifically, the selection step can be achieved by a modulo operation of PCI values. For example, a modulo operation can be performed to the number of candidate resources in each subset with the PCI, if an actual downlink resource bandwidth of 3 MHz corresponds to 5 candidate resources, actual downlink resource bandwidths of 5 MHz and 10 MHz respectively correspond to 10 and 20 candidate resources, and then perform a modulo operation to the three values above with the PCI value so as to the achieve selection or determination step.

The rule for determining or selecting candidate resources corresponding to different actual downlink resource bandwidths is unified, for example, translating from a low frequency side to a high frequency side one by one to determine or select candidate resources, as shown in FIG. 3(b) and FIG. 3(c), candidate resources corresponding to different actual downlink resource bandwidths are selected according to a unified rule, certainly also can selected from a high frequency to a low frequency, so that it can guarantee that the determined candidate resources corresponding to a plurality of actual downlink resource bandwidths do not overlap with each other, and the problem of fuzzy bandwidth detection shown in FIG. 3(a) can be avoided.

Generally, the central frequency point of the current cell can be acquired when the synchronization signal is detected. Therefore, after the UE determines the actual downlink resource bandwidth of the current cell, the actual downlink resources of the current cell can be determined.

Optionally, after the step 102, according to position information of common control channel detected resources, the actual downlink resource bandwidth of the current cell is further determined, where the common control channel detected resources are candidate resources detecting the common control channel of the current cell.

Figure 4:
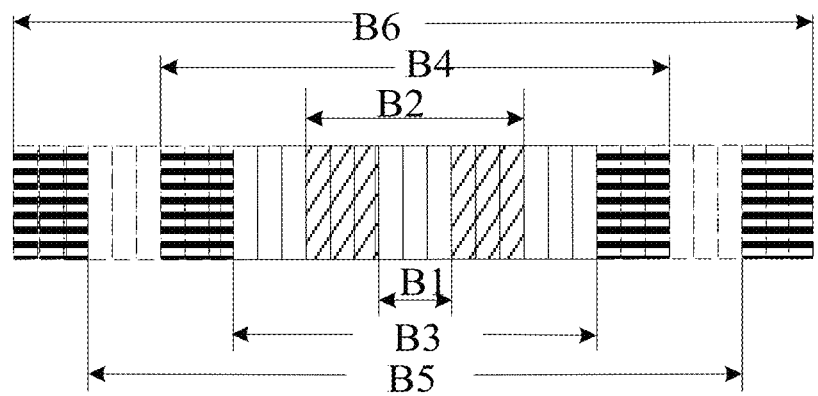
FIG. 4 is a schematic diagram of 6 downlink resource bandwidths supported by a cell according to an embodiment of the present invention.

FIG. 4 is a schematic diagram of 6 downlink resource bandwidths supported by a cell according to an embodiment of the present invention. In an embodiment of the present invention, the UE determines, according to the detected resource position information for the first candidate resource of the common control channel, the actual downlink resource bandwidth of the current cell.

It is assumed that the base station side supports six actual downlink resource bandwidths ranked from small to large, B1, B2 . . . B6, as shown in FIG. 4. If the UE detects the common control channel on a certain candidate resource within a range of B1, then the UE can implicitly determine the actual downlink resource bandwidth of the current cell is B1; if the UE detects the common control channel on a certain candidate resource within a range of B2 other than B1, then the UE can implicitly determine the actual downlink resource bandwidth of the current cell is B2; and so forth, if the common control channel is detected within a range of B2-B3, B3-B4, B4-B5 and B5-B6, it can be determined respectively that the actual downlink resource bandwidth of the current cell is B3, B4, B5 and B6. According to the method in embodiments of the present invention, the base station can support N actual downlink resource bandwidths, where N is a positive integer, not limited to the six types illustrated above. According to the resource position information of the first candidate resource which detects the common control channel, it is not necessary for the base station to explicitly indicate the actual downlink resource bandwidth of the current cell within the common control channel, so that overhead can be saved.

Further, the first downlink resource bandwidth can be determined according to the common control channel detected resources of a cell to be determined, if the cell to be determined is the current cell, the first downlink resource bandwidth is the actual downlink bandwidth of the current cell corresponding to the common control channel detected resources of the cell to be determined; if positional relationship between the common control channel detected resources of the cell to be determined and the current cell conforms to the positional relationship indicated by resource position indication information carried by the common control channel of the cell to be determined, then it can be determined that the first downlink resource bandwidth is an actual downlink resource bandwidth of the current cell, where the resource position indication information carried by the common control channel of the cell to be determined indicates the positional relationship between the common control channel detected resources of the cell to be determined and the cell to be determined.

Figure 5:
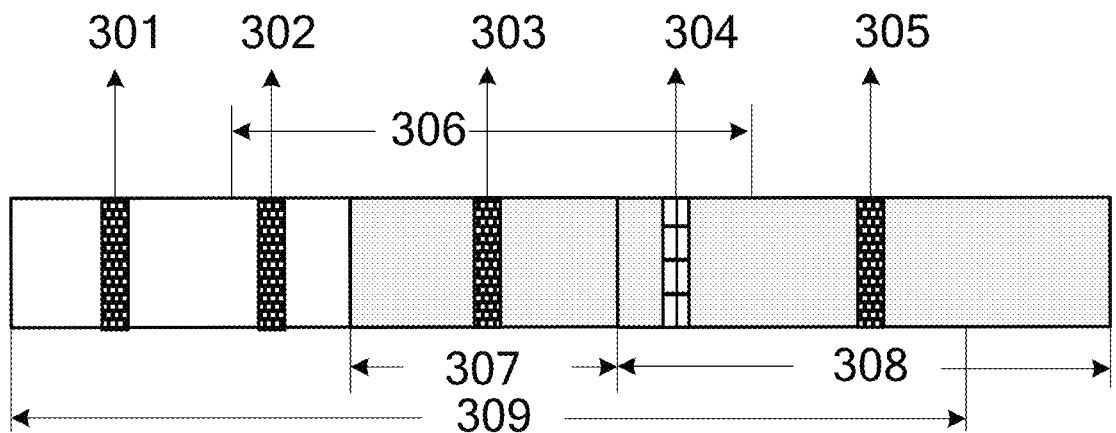
FIG. 5 is a schematic diagram of bandwidths and candidate resources of two cells according to an embodiment of the present invention.

FIG. 5 is a schematic diagram of bandwidths and candidate resources of two cells according to an embodiment of the present invention. According to an embodiment of the present invention, as shown in FIG. 5, 307 and 308 are different cells, a frequency resource bandwidth of cell 307 is 5 MHz, and a frequency resource bandwidth of cell 308 is 10 MHz. 309 is a virtual resource bandwidth of cell 307, and 301-305 are candidate resources in the virtual resource 309. The candidate resources of 301-303 indicate a frequency resource bandwidth of the cell where they are located is 5 MHz, and candidate resources of 304 and 305 indicate a frequency resource bandwidth of the cell where they are located is 10 MHz. If the common control channel is detected in 304, at this point, the common control channel actually is the common control channel of cell 308. However, if the actual downlink resource bandwidth of the cell is determined only according to resource position information of candidate resources of the common control channel, or only according to downlink resource bandwidth indication information of the common control channel, then it is possible to mistake the resources indicated by 306 for the actual downlink resource of the cell 307.

In order to solve the problem of fuzzy bandwidth detection, resource position indication information can be added in the common control channel, and the resource position indication information can be expressed by bits, scrambling codes or other information of the common control channel, which are not limited herein. The resource position indication information indicates positional relationship between the currently detected common control channel and the cell which the detected common control channel corresponds to or belongs to, for example, it indicates a position of the detected common control channel with respect to a central frequency point of the cell which the detected common control channel belongs to, for example, the detected common control channel is at a low frequency side or a high frequency side of the central frequency point, that is, the candidate resource 304 in FIG. 5 is located on the left of the cell 308 which the candidate resource 304 belongs to (i.e., the low frequency side, assuming that the frequency gradually increases from left to right), then the UE can identify the detected candidate resource 304 does not belong to cell 1, because the candidate resource 304 is on the right of the central frequency point of cell 307, and such post-checking or post-verification function can solve the problem of fuzzy bandwidth.

Of course, the above position information also can be other similar information, such as for indicating a positional relationship between the detected candidate resources and a boundary of the cell which the detected candidate resources belong to, or indicating a positional relationship between the detected candidate resources and the cell (such as, cell 307 in FIG. 5) to be detected by the UE, and so on, which is not limited herein, as long as the problem of fuzzy bandwidth can be solved.

Optionally, after the step 102, further determine, according to downlink resource bandwidth indication information carried by the common control channel of the current cell, the actual downlink resource bandwidth of the current cell. According to an embodiment of the present invention, the UE determines, according to downlink resource bandwidth indication information carried by the common control channel, the actual downlink resource bandwidth of the current cell. For example, the UE can acquire bits for indicating the actual downlink resource bandwidth of the current cell from the detected ePBCH, for instance, the detected information bits of "001", "100" and "110" can respectively indicate that the actual downlink resource bandwidths of the current cell are 5 MHz, 10 MHz and 20 MHz. The actual downlink resource bandwidth of the current cell can be explicitly determined according to downlink resource bandwidth indication information carried by the common control channel. Or, the actual downlink resource bandwidth can be indicated with cyclic redundancy check (CRC) mask carried by the detected ePBCH, or with a combination of bit and mask, or the like. Further, the UE can determine the actual downlink resources of the current cell.

Further, the second downlink resource bandwidth can be determined according to downlink resource bandwidth indication information carried by the common control channel of the cell to be determined, and the second downlink resource bandwidth is the downlink resource bandwidth of the common control channel of the cell to be determined; if the common control channel detected resources of the cell to be determined are within a frequency resource range of undetermined downlink resources of the current cell, then it can be determined that the second downlink resource bandwidth is the actual downlink resource bandwidth of the current cell, where the undetermined downlink resources of the current cell are cell downlink resources when the second downlink resource bandwidth is the cell bandwidth in the current cell.

The UE can determine, according to downlink resource bandwidth indication information carried by the common control channel of the cell to be determined, a second downlink resource bandwidth, and then judges whether the candidate resources detecting the common control channel of the cell to be determined are within a range of the current cell, according to positional relationship between the candidate resources detecting the common control channel of the cell to be determined and the current cell (for example, the relationship between the position of the candidate resources and the position of the central frequency point of the cell to be determined). For example, it is assumed that two neighboring cells A and B have the same PCI, and the same bandwidth of 5 MHz, and it is assumed that A is the current cell of the UE, and the common control channel is detected on a certain resource c of B, and then the UE can judge that resource c does not belong to the current cell A according to positional relationship (greater than 2.5 MHz) between resource c and the central frequency point of A.

Optionally, after the step 102, further determine, according to position information of the common control channel detected resources, resources of common search space of the current cell. The common control channel detected resources are candidate resources detecting the common control channel of the current cell, and the actual resources are resources actually used by the common search space of the current cell.

According to an embodiment of the present invention, it is assumed that at least one candidate resource included in the candidate resource set of the common control channel is resources a, b, c and d. It is assumed that the UE detects the common control channel of the current cell on the candidate resource b, and then determines resources of the common search space according to corresponding relationship between candidate resource b and resources of the common search space, for example, the corresponding relationship is between b and the next resource c, and then the candidate resource c is the resource of the common search space. Of course, embodiments of the present invention also can use other similar methods. For example, it also can be indicated that a part of candidate resource c is resources of common search space.

Further, when the actual resources of the common search space of the current cell is determined according to the position information of the common control channel detected resources, candidate resources where the common control channel detected resources are located can be acquired, according to the position information of the common control channel detected resources; it can be determined, according to corresponding relationship between candidate resources of common search space and candidate resources of the common control channel, that the candidate resources of the common search space corresponding to the candidate resources where the common control channel detected resources are located are the actual resources of the common search space, where the candidate resources of the common search space are candidate resources in the candidate resource set or candidate resources in a first common search space candidate resource set corresponding to the candidate resource set. According to another embodiment of the present invention, it is assumed that at least one candidate resource included in the candidate resource set of the common control channel is resources a, b, c and d, and the corresponding candidate resources of the common search space are resources a1, b1, c1 and d1.

There can be various manners for corresponding relationship between candidate resources of the common control channel and candidate resources of common search space. For example, the candidate resources of common search space can have one-to-one correspondence with the candidate resources of the common control channel, such as a1 to a, b1 to b, and the like, or the candidate resources of common search space can be a part of the candidate resources of the common control channel, namely, subset (such as a1 is a part of a, b1 is a part of b; or the candidate resources of common search space only include a1 and b1, and a1 equals to a, b1 equals to b, namely, a proper subset of the candidate resource set), or candidate resources of common search space can be a superset of the candidate resources of the common control channel, namely, parent set (such as a is a part of a1, b is a part of b1; or, the candidate resources of common search space are a, b, c, d, e, f, which are parent sets of the candidate resource set), or the candidate resources of common search space can be partially overlapped with the candidate resources of the common control channel (a1 is partially overlapped with a, b1 is partially overlapped with b; or the candidate resources of common search space are a, b, e, f, which are partially overlapped with the above candidate resource set), or the like. It is also assumed that the UE detects the common control channel of the current cell on the candidate resource b, and then determines resources of the common search space according to corresponding relationship between candidate resource b and resources of the common search space, for example, the corresponding relationship is between b and b1, and then candidate resource b1 is resource of the common search space. Of course, other similar methods are not precluded.

Optionally, after the step 102, further determine, according to common search space indication information carried by the common control channel of the current cell, actual resources of common search space of the current cell, where the actual resources are resources actually used by the common search space of the current cell. In an embodiment of the present invention, it is assumed that at least one candidate resource included in the candidate resource set of the common control channel is resources a, b, c and d. It is assumed that common search space indication information of the common control channel for indicating four resources or a part of the respective four resources is respectively expressed with "00", "01", "10" and "11", when the common search space indication information is "00", the UE can learn that resource of the common search space is candidate resource a, or a part of candidate resource a.

Further, when the actual resources of the common search space of the current cell are determined according to the common search space indication information carried by the common control channel of the current cell, it can be determined that all or a part of the candidate resources in the candidate resources indicated by the common search space indication information are actual resources of the common search space of the current cell, where the candidate resources indicated by the common search space indication information are candidate resources in the candidate resource set or candidate resources of a first common search space candidate resource set corresponding to the candidate resource set. According to an embodiment of the present invention, it is assumed that at least one candidate resource included in the candidate resource set of the common control channel is resources a, b, c and d, and their corresponding candidate resources are resources a1, b1, c1 and d1. It is assumed that common search space indication information of the common control channel for indicating four resources a1, b1, c1 and d1 or a part of the respective four resources is respectively expressed with "00", "01", "10" and "11", when the common search space indication information of the common control channel is "00", the UE can learn that resources of the common search space thereof are resource a1, or a part of resource a1. The corresponding relationship between two sets of {a, b, c, d} and {a1, b1, c1, d1} can be the above corresponding relationship between the candidate resources of the common control channel and the candidate resources of common search space, which will not be described in detail here. In addition, the common search space indication information in this embodiment also can be bits or scrambling codes in the common control channel, or the position information of the common control channel detected resources, that is, the indication information is indicated implicitly.

Optionally, after the step 102, further determine, according to the position information of the common control channel detected resources and the common search space indication information carried by the common control channel of the current cell, the resources of the common search space of the current cell, where the common control channel detected resources are candidate resources detecting the common control channel of the current cell.

According to an embodiment of the present invention, it is assumed that at least one candidate resource of the common control channel is resources a, b, c and d, and the UE detects the common control channel of the current cell on the candidate resource b. The resources of the common search space can be determined according to the candidate resource b and the common search space indication information, for example, a candidate resource of the common search space adjacent to candidate resource b is firstly determined through the candidate resource b, and resources of the common search space are determined in the candidate resources of the common search space through the common search space indication information. The candidate resources of the common search space can be predefined, or have corresponding relationship with the candidate resources in the candidate resource set of the common control channel, for example, they are one or more candidate resources in the candidate resource set. The specific corresponding relationship is similar to that between candidate resources of the common control channel and candidate resources of common search space.

When the resources of the common search space of the current cell are determined according to the position information of the common control channel detected resources and the common search space indication information carried by the common control channel of the current cell, according to the position information of the common control channel detected resources, a second common search space candidate resource set of the current cell can be determined, where the second common search space candidate resource set is a subset of the candidate resource set or a subset of the first common search space candidate resource set corresponding to the candidate resource set; according to the common search space indication information carried by the common control channel of the current cell and the second common search space candidate resource set, resources of common search space of the current cell can be determined.

According to another embodiment of the present invention, it is assumed that at least one candidate resource of the common control channel is resources a, b, c and d, and each candidate resource has one corresponding candidate resource set of the common search space. It is assumed that the UE detects the common control channel of the current cell on the candidate resource b, then it can be determined that the candidate resource set of the common search space corresponding to the candidate resource b is the candidate resource set of the common search space of the current cell. It is assumed that there are candidate resources a1, b1, c1 and d1 of the common search space in the candidate resource set of the common search space, the set is the second common search space candidate resource set, and also can be a subset of the first common search space candidate resource set corresponding to the candidate resource set. The UE can determine the resource of the common search space in the above set through the common search space indication information of the common control channel, for example, the common search space indication information takes the value of "01", and it can be determined that the resource of the common search space is b1. Of course, other similar methods are not precluded. In the above method, one set of the candidate resources of the common search space is firstly determined, and the resource of the common search space is then determined in the set with the common control channel, so that overhead of bits or scrambling codes in the common control channel can be saved, which facilitates to guarantee performance of the common control channel.

Optionally, it can be determined that all or a part of at least one candidate resource in the candidate resource set is resource of the common search space of the current cell through CRC mask of the common control channel.

Optionally, it can be determined that, all or a part of the candidate resources in the candidate resource set are candidate resources of the common search space according to the PCI of the current cell. One possible determining method is to take the modulo of the total number of the candidate resources in the candidate resource set with the PCI serial number of the current cell, and the obtained remainder is a label of the candidate resource of the common search space of the current cell. Of course, the embodiments of the present invention also can use other methods for determining the candidate resource of the common search space according to the PCI. For example, the candidate resource of the common search space also can be determined according to a subframe label. For example, there are ten subframe labels 1 to 10 in total, if the UE detects the common control channel on the i-th (i is a natural number less than or equal to 10) subframe, and the specific label of the candidate resource of the common search space in the candidate resource set can be determined according to the i, and the like. Further, the candidate resources of the common control channel of the current cell can be detected in the resources of the common search space, or in the candidate resources other than resources of the common search space in the candidate resource set.

Optionally, all or a part of the candidate resources in the candidate resource set are the resources of the common search space, the candidate resource set or a part of the candidate resources in the set can be determined by the PCI of the current cell, such as in a manner of performing the modulo operation as above. Then, the candidate resources of the common control channel of the current cell can be detected in the above resources of the common search space, or in the resources other than the resources of the common search space of the cell in the candidate resource set. Specific details for detecting the common control channel and acquiring the actual downlink resource bandwidth are as described in the above embodiments.

Optionally, determine, according to the PCI of the current cell and/or the position information of the common control channel detected resources, a first part of resources of the common search space of the current cell, and determine, according to the common search space indication information carried by the common control channel of the current cell, a second part of resources of the common search space of the current cell. The first part of resources and the second part of resources form resources of common search space of the current cell. The manners of determining the first part of resources and the second part of resources are similar to those in embodiments of determining resources of the common search space, which will not be described in detail here. In embodiments of the present invention, the resources of the common search space consist of the first part of resources and the second part of resources, and the two parts of resources are two resource sets of the common search space, such as like two resource sets of distributed ePDCCH. Of course, the resources of the common search space also can be divided into many parts, and each part corresponds to a manner of determining resources, which is not limited in the embodiments of the present invention.

Further, the blind detection for the common control channel and the blind detection for PDCCH or ePDCCH in the common search space can be separately configured. The blind detection can be interpreted as, taking the common control channel detection as an example, the UE needs to detect at least two candidate resources to determine the common control channel, while the UE only needs to detect one ascertained resource for the non-blind detection. The blind detections can be separately configured, which means that the blind detection of the common control channel is not associated with the times of blind detection in the common search space, for example, the common search space still keeps the current 12 times of blind detection, while the times of blind detection in the common control channel can be freely configured, such as 6 times. However, considering that the previous PBCH needs no blind detection, how to simultaneously perform blind detection to the common control channel and the control channel in the common search space, as well as the control channel in the UE-specific search space, will increase the times of blind detection of the UE and complexity of the UE. Therefore, it can be specified that the UE will not simultaneously perform blind detection to the common control channel and the control channel in other search space, wherein the other search space includes the common search space and/or the UE-specific search space.

Optionally, paging scheduling information or a paging message can carry resource information of common control channel or common search space, and the paging scheduling information is PDCCH or ePDCCH for scheduling the paging message. Taking the common control channel as an example, the current mechanism is that, if system information (such as, information included in the common control channel) changes, the UE is notified through paging, and at this point, the UE may still need to perform blind detection to the control channel in the common search space and/or the UE-specific search space. To avoid increasing blind detection of the UE, i.e., simultaneously performing blind detection to the common control channel and the control channel in other search space mentioned in the above embodiments, change of configuration information of the common control channel, such as change of the resource position, is indicated to the UE through the paging, so that the UE does not need to acquire a new resource position of the common control channel through the blind detection, when the position of the common control channel changes. The UE only needs to perform blind detection to the common control channel when it initially accesses to the current cell, and the UE at least does not need to perform blind detection to the control channel in the UE-specific search space at this point, thereby not increasing blind detection of the UE.

Optionally, the common control channel also carries at least one of the following information: actual downlink resource bandwidth information of the current cell, system radio frame number, antenna port number, antenna port numbers, physical hybrid automatic repeat request indicator channel PHICH configuration information, enhanced physical hybrid automatic repeat request indicator channel ePHICH configuration information, scheduling information of a first system information block SIB1 in a system information block SIB and configuration information of SIB other than the SIB1.

According to an embodiment of the present invention, the common control channel can be a resource mapping of the original PBCH, such as occupying four symbols and a frequency domain width of six PRBs; also can be a resource mapping of the ePBCH, such as a resource mapping of the ePDCCH, and a specific minimum resource unit can be a PRB, a PRB pair, an enhanced control channel element (including a plurality of resource element groups) or an enhanced resource element group (including a plurality of resource elements) and the like. The information carried by the PBCH or ePBCH can be at least one of actual downlink resource bandwidth of the current cell, system radio frame number, antenna port number, antenna port numbers, PHICH configuration information, and ePHICH configuration information.

The PBCH or ePBCH also can carry scheduling information for scheduling a first system information block, such as scheduling SIB1, the SIB1 can configure a time window for transmitting other SIBs, such as SIB2 through SIB13. The scheduling information specifically can include at least one of modulation encoding mode, resource allocation information and so on. In this way, SIB1 can be scheduled directly with PBCH or ePBCH, not with the separate ePDCCH or PDCCH, so that the system design can be simplified.

In order to limit blind decoding times of the control channel, a load size (payload size) of the common control channel, i.e., original information bits (including CRC bits) before encoding, equals to a load size of a control channel (such as ePDCCH) for scheduling other common control information (such as random access response, paging, set power control, and etc.) transmitted in the common search space. In addition, for a dedicated control channel, taking a dedicated ePDCCH as an example, i.e., UE-specific ePDCCH, dedicated ePDCCH of certain formats also can be scheduled in the common search space, such as dedicated ePDCCH of format 0 or 1A, however, the ePBCH also needs to carry the original PBCH information, therefore, a load size of the ePBCH will be greater than a load size of the dedicated ePDCCH of the original format 0 or 1A, and then the load size of the dedicated ePDCCH of this format in the common search space will be greater than the load size of the dedicated ePDCCH of this format in the dedicated search space of the UE, and the exceeding portion can carry other information, such as configuration information of a channel status information reference signal CSI-RS, and configuration information of a current cell discovery signal and the like. Or, the load size of the common control channel for scheduling the SIB also can equal to the load size of the control channel in the common search space, such as equal to the load size of the control channel of format 1A/0/3/3A. However, the common control channel will also add scheduling information of for scheduling SIB, one method is that the scheduling information borrows a format of the scheduling information of format 1C, which is of severely compressed format, and has a load size much smaller than that of format 1A, and then the common control channel not only carries original configuration information, but also borrows the format of the scheduling information of format 1C, so that the load size can be equal to that of the format 1A, and the times of blind detection in the common search space will not be increased.

According to another embodiment of the present invention, the common control channel can be PDCCH or ePDCCH originally scheduling the first system information block, wherein the first system information block may be SIB1, and the SIB1 can configure a time window for transmitting other SIBs, such as SIB2 through SIB13. Then assuming that a system will not transmit PBCH or ePBCH, and therefore, the information carried by the PBCH or ePBCH, such as, at least one of actual downlink resource bandwidth of the current cell, system radio frame number, antenna port number, antenna port numbers, PHICH configuration information, and ePHICH configuration information, can be carried in SIB1 or other SIB, so that the system design can be simplified, and separate physical channel of PBCH or ePBCH can be saved.

Optionally, the bandwidth of the virtual downlink resources determined by the UE can be greater than or equal to the actual downlink resource bandwidth of the current cell. For example, the actual downlink resource bandwidth of the current cell is 10 MHz, and the bandwidth of the virtual downlink resources can be 10 MHz or 20 MHz.

Optionally, the bandwidth of the virtual downlink resources can be greater than or equal to a predefined downlink resource bandwidth. The predefined downlink resource bandwidth is determined by a system accessed by a current user. For example, in the current LTE system, the predefined downlink resource bandwidth is a frequency domain width of 6 PRB pairs in the center of the current cell.

Optionally, in the step 102, detect, in a first subframe, a first common control channel of the current cell on a third candidate resource in the at least one candidate resource, and detect, in a second subframe, a second common control channel of the current cell on a fourth candidate resource in the at least one candidate resource, wherein the first subframe and the second subframe are two subframes with different times, the third candidate resource and the fourth candidate resource have different frequency resource positions, and the first common control channel and the second common control channel carry the same original bit information.

According to an embodiment of the present invention, it is assumed that at least one candidate resource of the common control channel is resources a, b, c and d, the four candidate resources have different frequency domain positions and the time domain resources for transmitting the common control channel are frame 1, frame 2, frame 3 and frame 4. Particularly, four candidate resources are included in each group, a plurality of candidate resources in each group are distributed in at least two subframes (four subframes in this example), and the candidate resources in at least two subframes have different frequency domain positions, for example, the common control channel of a cell is actually transmitted by the resources (i.e., the common control channel detected resources) which are four resources on four subframes of a first set, specifically, subframe 1 is transmitted on a, subframe 2 is transmitted on b, subframe 3 is transmitted on c, subframe 4 is transmitted on d; the common control channel of another cell is actually transmitted by the resources (i.e., the common control channel detected resources) which are four resources on four subframes of a second set, specifically, subframe 1 is transmitted on b, subframe 2 is transmitted on c, subframe 3 is transmitted on d, subframe 4 is transmitted on a; still another cell with a third set of c, d, a, b; yet another cell with a fourth set of d, a, b, c; the above cyclic resource reuse is just an example, the common control channel carried by the candidate resources in each candidate resource set corresponds different transmission copies of the same cell, for example, if PBCH or ePBCH is transmitted once in each frame, and four transmissions in the continuous four frames correspond to the same original information copy, that is, the UE can perform a combination to improve performance. The candidate resources of the common control channel for carrying the same original bit information in each group occupy different frequency domain positions, so that frequency diversity gain can be obtained, and a detection performance of the common control channel can be improved.

Further, the candidate resources corresponding to time domain resources of the first common control channel can be overlapped with the candidate resources corresponding to time domain resources of the second common control channel, where the first common control channel and the second common control channel are the common control channels for carrying different original bit information in the current cell.

According to an embodiment of the present invention, it is assumed that at least one candidate resource of the common control channel is resources a, b, c and d, and the time domain resources for transmitting the common control channel are frame 1, frame 2, frame 3 and frame 4. One set of manner for transmitting the common control channel is that, frames 1 and 2 are transmitted on a, frames 3 and 4 are transmitted on b, and another set of manner for transmitting the common control channel is that, frames 1 and 2 are transmitted on b, frames 3 and 4 are transmitted on c. The partially overlapped configuration is suitable to be applied when the total resources are limited, and a certain flexibility of interference coordination can be obtained when the total resources are limited. In addition, the solution that resources are partially overlapped in the common control channel of multiple cells can make interference randomization when the total resources are limited.

Figure 6:
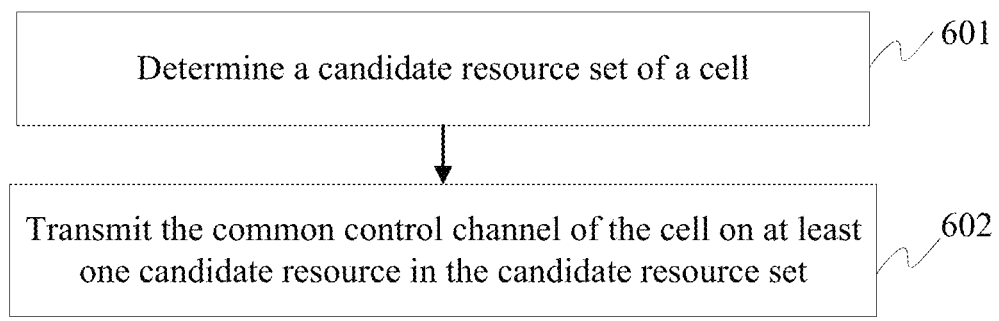
FIG. 6 is a flow chart of a method for transmitting a common control channel according to an embodiment of the present invention.

FIG. 6 is a flow chart of a method for transmitting a common control channel according to an embodiment of the present invention. The method in FIG. 6 is implemented by a base station.

601, select at least one first resource from a candidate resource set of a cell, where the candidate resource set is a set of candidate resources used by the cell when transmitting the common control channel.

602, transmit the common control channel of the cell on the at least one first resource.

In embodiments of the present invention, at least one first resource is selected in the candidate resource set of the cell, and the common control channel is transmitted on the at least one first resource, so that inter-cell interference of the common control channel can be coordinated, and detection performance of the common control channel can be improved.

Optionally, before step 601, the method further includes: the candidate resource set is determined in the actual downlink resources of the cell. The base station can determine the candidate resource set of the cell in the actual downlink resources of the cell according to a predetermined policy. For example, taking a central frequency point of the cell as a reference, one candidate resource is determined every other certain frequency domain resource blocks to both sides, and meanwhile the size of each candidate resource and size of an interval are specified. Of course, other manners for determining the candidate resource set also may exist, which is not limited herein.

Optionally, before the step 601, determine at least one first candidate resource from the candidate resource set according to the PCI of the cell, where the number of the at least one first candidate resource is less than or equal to the number of the candidate resources in the candidate resource set. At this point, in step 601, at least one first resource is selected from the at least one first candidate resource. Optionally, as another embodiment, the total numbers of the candidate resources in the candidate resource set can be taken the modulo with the PCI serial number of the cell, and the obtained remainder is a candidate resource label of the common control channel transmitted by the cell. Of course, other similar determining methods according to the PCI are not excluded. For example, the first candidate resource also can be determined according to a subframe label. If there are 10 subframe labels 1 to 10 in total, then the base station transmits the common control channel at the i-th (i is a natural number less than or equal to 10) subframe, and indicates for the UE the specific label of the first candidate resource in the candidate resource set through the i-th subframe. In embodiments of the present invention, the base station determines at least one first candidate resource from the candidate resource set according to the PCI, and selects at least one first resource from the at least one first candidate resource, so as to narrow the range of detecting the common control channel of the cell by the UE.

Optionally, the candidate resource set includes at least one candidate resource subset. Each candidate resource subset in the candidate resource set corresponds to an actual downlink resource bandwidth of the cell. The candidate resource subset can be determined by pre-configuration or pre-negotiation, or the candidate resource subset can be determined by partitioning subset of the candidate resource set through the PCI, and embodiments of the present invention are not limited thereto.

Optionally, as another embodiment, the current cell can have two actual downlink resource bandwidths, that is, a first actual downlink resource bandwidth and a second actual downlink resource bandwidth. Correspondingly, the candidate resource set includes a first candidate resource subset and a second candidate resource subset, each of which includes at least one candidate resource, and the candidate resource of the first candidate resource subset corresponds to the first actual downlink resource bandwidth, and the candidate resource of the second candidate resource subset corresponds to the second actual downlink resource bandwidth. When the bandwidth is the first actual downlink resource bandwidth, the common control channel of the cell is transmitted on the candidate resources in the first candidate resource subset; when the bandwidth of the cell is the second actual downlink resource bandwidth, the common control channel is transmitted on the candidate resources in the second candidate resource subset.

Further, a resource unit of the candidate resource in the candidate resource set has a maximum frequency domain width less than or equal to half of the actual downlink resource bandwidth corresponding to the candidate resource, and the resource unit can be a PRB, a PRB pair, a control channel element or a resource element group of the candidate resource consisting of the candidate resource. For example, if one candidate resource occupies two control channel elements, then the resource unit can be a control channel element.

Further, one of the candidate resources in the candidate resource subset is a frequency domain shift copy of the other candidate resources in the candidate resource subset. FIG. 3 is a schematic diagram of candidate resources of cells with the same PCI according to an embodiment of the present invention. FIGS. 3 (a), (b) and (c) are three sets of different solutions for candidate resources, the bottom left corner of each set is a schematic diagram of candidate resources of cell 1, the middle on the top is a schematic diagram of candidate resources of cell 0, and the bottom right corner is a schematic diagram of candidate resources of cell 2. For purposes of explanation, it is assumed that one candidate resource consists of two PRB pairs, that is, the resource unit corresponds to the PRB pair, but the manner of forming the candidate resources is not limited in the embodiments of the present invention. As shown in FIG. 3, it is assumed that three actual downlink resource bandwidths are 3 MHz, 5 MHz and 10 MHz respectively, and other cases are similar thereto. It is assumed that the actual downlink resource bandwidth of cell 0 is 3 MHz, cell 1 and cell 2 which are adjacent to cell 0 to the left and right both are 10 MHz respectively, and the three cells have the same PCI, that is, it is assumed that the three cells are deployed in one geographical position.

FIG. 3 shows the candidate resource corresponding to each actual downlink resource bandwidth, and it can be seen from FIG. 3($a$) that, the candidate resources corresponding to an actual bandwidth of 10 MHz within the virtual downlink bandwidth of cell 0 are overlapped with the candidate resources, which actually transmit the common control channel, of cell 1 and cell 2 (a candidate resource position pointed to by "Z2" in FIG. 3($a$)), which may cause a problem of fuzzy bandwidth detection. Specifically, a UE trying to detect the common control channel of cell 0 may detect a common control channel of 10 MHz on the candidate resources of cell 1 or cell 2, which may cause the UE to mistake the actual bandwidth of cell 0 for 10 MHz, and cause fuzzy bandwidth detection. The problem of fuzzy bandwidth detection at the UE side can be circumvented by a method for allocating candidate resources in FIG. 3($b$) and FIG. 3($c$).

As shown in FIG. 3($b$), the frequency domain width between two PRB pairs in each candidate resource is half of the actual downlink resource bandwidth corresponding to the candidate resource, and a plurality of candidate resources corresponding to the actual downlink resource bandwidth are frequency domain shift copies of each other. FIG. 3($c$) shows a case after shift of FIG. 3($b$). It can be seen that, neither a case of candidate resource overlapping shown in FIG. 3($a$) nor the problem of fuzzy bandwidth detection at the UE side will occur.

Optionally, before step 601, the method further includes: determining, according to the actual downlink resource bandwidth of the cell, a first candidate resource subset corresponding to the actual downlink resource bandwidth of the cell in the candidate resource set. At this point, in step 601, at least one first resource is selected from the first candidate resource subset. In another embodiment, it is assumed that the current cell can select to use two actual downlink resource bandwidths, that is, a first actual downlink resource bandwidth and a second actual downlink resource bandwidth, and it is also assumed that a first candidate resource subset in the candidate resource set corresponds to the first actual downlink resource bandwidth, and a second candidate resource subset in the candidate resource set corresponds to the second actual downlink resource bandwidth. When the downlink resource bandwidth of the cell is a first actual downlink resource bandwidth, then it can be determined that the candidate resources in the first candidate resource subset are candidate resources transmitting the common control channel of the cell, and at least one first resource is selected from the first candidate resource subset. When the downlink resource bandwidth of the cell is a second actual downlink resource bandwidth, then it can be determined that the candidate resources in the second candidate resource subset are candidate resources transmitting the common control channel of the cell, and at least one first resource is selected from the second candidate resource subset. Of course, the candidate resource set also can possess only one candidate resource subset, or 3 or more candidate resource subsets, and the candidate resource subset corresponds to one actual downlink resource bandwidth of the cell.

Optionally, in step 601, it can be determined the candidate resource corresponding to the actual downlink resource bandwidth of the cell in the candidate resource set is the first resource according to the actual downlink resource bandwidth of the cell. In another embodiment, it is assumed that the base station side supports six actual downlink resource bandwidths ranked from small to large, B1, B2 . . . B6, as shown in FIG. 4. If the actual downlink resource bandwidth of the cell is B1, then the base station can transmit a common control channel on a certain candidate resource within a range of B1; if the actual downlink resource bandwidth of the cell is B2, then the base station can transmit a common control channel on a certain candidate resource within a range of B2 other than B1; and so forth, if the actual downlink resource bandwidths of the cell are B3, B4, B5 and B6, then the base station can transmit a common control channel within a range of B2-B3, B3-B4, B4-B5 and B5-B6. According to the method in embodiments of the present invention, the base station can support N actual downlink resource bandwidths, N is a positive integer, and is not limited to the six types illustrated above. According to the resource position information of the first candidate resource which detects the common control channel, it is not necessary for the base station to explicitly indicate the actual downlink resource bandwidth of the cell within the common control channel, so that overhead can be saved.

Optionally, the common control channel of the cell also carries downlink resource bandwidth indication information for indicating an actual downlink resource bandwidth of the cell. In another embodiment, the base station can carry the downlink resource bandwidth indication information in the common control channel transmitted by the cell, for instance, the information bits of "001", "100" and "110" can respectively indicate that the actual downlink resource bandwidths of the cell are 5 MHz, 10 MHz and 20 MHz. The actual downlink resource bandwidth of the cell can be explicitly determined according to downlink resource bandwidth indication information carried by the common control channel. Or, the base station can indicate the actual downlink resource bandwidth with CRC mask carried by the ePBCH, or with a combination of bit and mask, or the like.

Optionally, the common control channel of the cell further carries resource position indication information for indicating to transmit positional relationship between the candidate resources which transmits the common control channel of the cell and the cell. The problem of fuzzy bandwidth detection at the UE side can be solved by combining position information of the resource which transmits the common control channel and resource position indication information carried by the common control channel.

As shown in FIG. 5, in another embodiment, 307 and 308 are two different cells, a frequency resource bandwidth of cell 307 is 5 MHz, and a frequency resource bandwidth of cell 308 is 10 MHz. 309 is a virtual resource bandwidth of cell 307 detected by the UE side, 301-305 are candidate resources within the virtual resource 309. The candidate resources 301-303 indicate a frequency resource bandwidth of the cell where they are located is 5 MHz, and candidate resources 304 and 305 indicate a frequency resource bandwidth of the cell where they are located is 10 MHz. If the base station transmits a common control channel on the candidate resource 304 of cell 308, and then the UE may mistake the detected common control channel for the common control channel of cell 307. If the actual downlink resource bandwidth of the cell is determined only according to resource position information of the candidate resource of the common control channel, then the UE may mistake the resource shown by 306 for the actual downlink resource of cell 307.

In order to solve the problem of fuzzy bandwidth detection, resource position indication information can be added in the common control channel, and the resource position indication information can be expressed by bits, scrambling codes or other information of the common control channel, which are not limited herein. The resource position indication information indicates positional relationship between the currently detected common control channel and the cell which the detected common control channel corresponds to or belongs to, for example, it indicates a position of the detected common control channel with respect to a central frequency point of the cell which the detected common control channel belongs to, for example, the detected common control channel is at a low frequency side or a high frequency side of the central frequency point, that is, the candidate resource 304 in FIG. 5 is located on the left of the cell 308 which the candidate resource 304 belongs to (i.e., the low frequency side, assuming that the frequency gradually increases from left to right), then the UE can identify the detected candidate resource 304 does not belong to cell 1, because the candidate resource 304 is on the right of the central frequency point of cell 307, and such post-checking or post-verification function can solve the problem of fuzzy bandwidth.

Of course, the above position information also can be other similar information, such as for indicating a positional relationship between the detected candidate resources and a boundary of the cell which the detected candidate resources belong to, and so on, which are not limited herein, as long as the problem of fuzzy bandwidth can be solved.

Optionally, the common control channel of the cell can carry downlink resource bandwidth indication information and resource position indication information at the same time. The downlink resource bandwidth indication information indicates actual downlink resource bandwidth of the cell, and the resource position indication information indicates a positional relationship between the candidate resources, which transmit the common control channel of the cell, and the cell. The problem of fuzzy bandwidth detection at the UE side can be solved by combining resource position indication information carried by the common control channel and downlink resource bandwidth indication information.

Another embodiment of the present invention is as shown in FIG. 5, 307 and 308 are two different cells, a frequency resource bandwidth of cell 307 is 5 MHz, and a frequency resource bandwidth of cell 308 is 10 MHz. 309 is a virtual resource bandwidth of cell 307 detected by the UE side, 301-305 are candidate resources within the virtual resource 309. The downlink resource bandwidth indication information of the common control channel on 301-303 indicates that a frequency resource bandwidth of the cell where they are located is 5 MHz, and the downlink resource bandwidth indication information of the common control channel on 304 and 305 indicates that a frequency resource bandwidth of the cell where they are located is 10 MHz. If the base station transmits a common control channel on the candidate resource 304 of cell 308, and then the UE may mistake the detected common control channel for the common control channel of cell 307. If the actual downlink resource bandwidth of the cell is determined only according to downlink resource bandwidth indication information of the detected common control channel, then the UE may mistake the resource shown by 306 for the actual downlink resource of cell 307. In order to solve the problem of fuzzy bandwidth detection at the UE side, the common control channel can add resource position indication information for indicating a positional relationship between the candidate resource which transmits the common control channel of the cell and the cell.

Optionally, the position information of the at least one first resource is further used to indicate actual resources of common search space of the cell for a UE. In another embodiment, it is assumed that at least one candidate resource included in the candidate resource set of the common control channel is resources a, b, c and d. It is assumed that the base station selects to transmit the common control channel on the candidate resource b, and then the actual resources of common search space can be determined according to relationship between the candidate resource b and the candidate resource of the common search space. For example, the corresponding relationship is between b and the next resource c, and then the candidate resource c is the actual resource of the common search space, of course, other similar methods are not excluded. Further, the base station can indicate for the UE, according to corresponding relationship between candidate resources of common search space of the cell and candidate resources of the common control channel of the cell, that candidate resource of common search space corresponding to the position information of the at least one first resource is the actual resource of common search space of the cell, where, the candidate resources of the common search space are candidate resources in the candidate resource set or candidate resources in the candidate resource set of the common search space corresponding to the candidate resource set.

Optionally, the common control channel of the cell further carries first common search space indication information for indicating actual resources of the common search space of the cell. In another embodiment, it is assumed that at least one candidate resource included in the candidate resource set of the common control channel is resources a, b, c and d. It is assumed that common search space indication information of the common control channel for indicating four resources or a part of the respective four resources is respectively expressed with "00", "01", "10" and "11", the base station determines that resources of the common search space are candidate resource a, or a part of candidate resource a, and takes "00" as the common search space indication information carried by the common control channel.

Optionally, the actual resources indicated by the first common search space indication information are all or a part of the candidate resources in the candidate resource set; or the actual resources indicated by the first common search space indication information are all or a part of the candidate resources in the first common search space candidate resource set corresponding to the candidate resource set.

In another embodiment of the present invention, it is assumed that at least one candidate resource included in the candidate resource set of the common control channel is resources a, b, c and d, and their corresponding candidate resources are resources a1, b1, c1 and d1. It is assumed that common search space indication information of the common control channel for indicating four resources a1, b1, c1 and d1 or a part of the respective four resources is respectively expressed with "00", "01", "10" and "11", when the common search space indication information of the common control channel is "00", the base station can indicates the UE that resource of the common search space of the cell is resource a1, or a part of resource a1.

There can be various manners for corresponding relationship between candidate resources of the common control channel and candidate resources of common search space. For example, the candidate resources of common search space can have one-to-one correspondence with the candidate resources of the common control channel, such as a1 to a, b1 to b, and the like, or the candidate resources of common search space can be a part of the candidate resources of the common control channel, namely, subset (such as a1 is a part of a, b1 is a part of b; or the candidate resources of common search space only include a1 and b1, and a1 equals to a, b1 equals to b, namely, a proper subset of the candidate resource set), or candidate resources of common search space can be a superset of the candidate resources of the common control channel, namely, parent set (such as a is a part of a1, b is a part of b1; or, the candidate resources of common search space are a, b, c, d, e, f, which are parent sets of the candidate resource set), or the candidate resources of common search space can be partially overlapped with the candidate resources of the common control channel (a1 is partially overlapped with a, b1 is partially overlapped with b; or the candidate resources of common search space are a, b, e, f, which are partially overlapped with the above candidate resource set), or the like. It is also assumed that the UE detects the common control channel of the current cell on the candidate resource b, and then determines resources of the common search space according to corresponding relationship between candidate resource b and resources of the common search space, for example, the corresponding relationship is between b and b1, and then candidate resource b1 is resource of the common search space. Of course, other similar methods are not precluded.

Optionally, the position information of the at least one first resource is further used to indicate candidate resources of common search space of the cell for a UE. The common control channel of the cell further carries second common search space indication information for indicating a position of the actual resources of the common search space of the cell in the candidate resources of common search space.

In another embodiment, it is assumed that at least one candidate resource of the common control channel is resources a, b, c and d, and the base station transmits the common control channel of the cell on the candidate resource b, the resources of the common search space can be indicated to the UE according to the candidate resource b and the common search space indication information, for example, a candidate resource e of the common search space adjacent to candidate resource b is firstly indicated to the UE through the candidate resource b, and the actual resource of the common search space, such as a resource unit of the candidate resource e of the common search space, is then indicated to the UE in the candidate resource of the common search space through the common search space indication information. The candidate resource of the common search space can be predefined, or have corresponding relationship with the candidate resource in the candidate resource set of the common control channel, such as one or more candidate resources in the candidate resource set.

Or, optionally, the position information of the at least one first resource is further used to indicate a second common search space candidate resource set of the common search space of the cell for a UE, and the second common search space candidate resource set is a subset of the candidate resource set or a subset of the first common search space candidate resource set corresponding to the candidate resource set; the common control channel of the cell further carries third common search space indication information for indicating a position of the actual resources of the common search space of the cell in the second common search space candidate resource set.

In another embodiment, it is assumed that the candidate resource set of the common search space is the first common search space candidate resource set corresponding to candidate resource set of the common control channel, and it is also assumed that at least one candidate resource of the common control channel is resources a, b, c and d, and each candidate resource has one corresponding second common search space candidate resource set, which respectively is {a1,a2,a3,a4}, {b1,b2,b3,b4}, {c1,c2,c3,c4} and {d1,d2,d3, d4}, and the base station transmits the common control channel of the cell on the candidate resource b, and then it can be indicated to the UE that the candidate resource b corresponds to the second common search space candidate resource set {b1,b2,b3,b4}.

Further, the base station can carry common search space indication information, for indicating a position of resources of the common search space in the first common search space candidate resource set, on the common control channel, for example, the common search space indication information takes the value of "01", and it can be determined that the resource of the common search space is b1. Of course, other similar methods are not precluded. In the above method, one first common search space candidate resource set of the candidate resources of the common search space is firstly indicated to the UE, and the resource of the common search space is then indicated in the first common search space candidate resource set with the common control channel, so that overhead of bits or scrambling codes in the common control channel can be saved, which facilitates to guarantee performance of the common control channel.

Optionally, the position information of the at least one first resource is further used to indicate a first part of resources of common search space of the cell for a UE; the common control channel of the current cell further carries fourth common search space indication information for indicating a second part of resources of the common search space of the current cell; and the actual resources of common search space of the current cell include the first part of resources and the second part of resources.

In another embodiment, it is assumed that the common control channel at least includes resources a, b, c and d, and the corresponding candidate resources of the common search space at least includes candidate resources a1, b1, c1 and d1. It is assumed that the candidate resources of the common search space at least also includes candidate resources a2, b2, c2 and d2, the corresponding common search space indication information of the common control channel is respectively expressed with "00", "01", "10" and "11". It is assumed that the base station transmit the common control channel of the cell on the candidate resource a, when the common search space indication information carried in the common control channel of the cell is "00", it is indicated that resources of the common search space of the cell are a1 and a2.

Optionally, the base station can determine a rule for selecting candidate resources of common search space of the cell from the candidate resource set according to the PCI of the cell, so that the UE can select candidate resources of common search space of the cell according to the same rule. Optionally, as another embodiment, the total numbers of the candidate resources in the candidate resource set can be taken the modulo with the PCI serial number of the cell, and the obtained remainder is a candidate resource label of the common search space of the cell. Of course, other similar determining methods according to the PCI are not excluded. For example, the candidate resource of the common search space also can be determined according to a subframe label. If there are 10 subframe labels 1 to 10 in total, then the base station transmits the common control channel at the i-th (i is a natural number less than or equal to 10) subframe, and indicates for the UE the specific label of the candidate resource of the common search space in the candidate resource set through the i-th subframe.

Optionally, if the candidate resources of the common search space of the cell are a part of candidate resources in the candidate resources set, then the base station can select at least one first resource from the candidate resources other than resources of the common search space of the cell in the candidate resource set so as to transmit the common control channel of the cell.

Optionally, the common control channel of the current cell also can carry at least one of the following information: actual downlink resource bandwidth information of the cell, system radio frame number, antenna port number, antenna port numbers, physical hybrid automatic repeat request indicator channel PHICH configuration information, enhanced physical hybrid automatic repeat request indicator channel ePHICH configuration information, scheduling information of a first system information block SIB1 in a system information block SIB and configuration information of SIB other than the SIB1.

According to an embodiment of the present invention, the common control channel can be a resource mapping of the original PBCH, such as occupying four symbols and a frequency domain width of six PRBs; also can be a resource mapping of the ePBCH, such as a resource mapping of the ePDCCH, and a specific minimum resource unit can be a PRB, a PRB pair, an enhanced control channel element (including a plurality of resource element groups) or an enhanced resource element group (including a plurality of resource elements) and the like. The information carried by the PBCH or ePBCH can be at least one of actual downlink resource bandwidth of the cell, system radio frame number, antenna port number, antenna port numbers, PHICH configuration information, and ePHICH configuration information.

The PBCH or ePBCH also can carry scheduling information for scheduling a first system information block, such as scheduling SIB1, the SIB1 can configure a time window for transmitting other SIBs, such as SIB2 through SIB13. The scheduling information specifically can include at least one of modulation encoding mode, resource allocation information and so on. In this way, SIB1 can be scheduled directly with PBCH or ePBCH, not with the separate ePDCCH or PDCCH, so that the system design can be simplified.

In order to limit blind decoding times of the control channel, a load size (payload size) of the common control channel, i.e., original information bits (including CRC bits) before encoding, equals to a load size of a control channel (such as ePDCCH) for scheduling other common control information (such as random access response, paging, set power control, and etc.) transmitted in the common search space. In addition, for a dedicated control channel, taking a dedicated ePDCCH as an example, i.e., UE-specific ePDCCH, dedicated ePDCCH of certain formats also can be scheduled in the common search space, such as dedicated ePDCCH of format 0 or 1A, however, the ePBCH also needs to carry the original PBCH information, therefore, a load size of the ePBCH will be greater than a load size of the dedicated ePDCCH of the original format 0 or 1A, and then the load size of the dedicated ePDCCH of this format in the common search space will be greater than the load size of the dedicated ePDCCH of this format in the dedicated search space of the UE, and the exceeding portion can carry other information, such as configuration information of a channel status information reference signal CSI-RS, and configuration information of a cell discovery signal and the like. Or, the load size of the common control channel for scheduling the SIB also can equal to the load size of the control channel in the common search space, such as equal to the load size of the control channel of format 1A/0/3/3A. However, the common control channel will also add scheduling information of for scheduling SIB, one method is that the scheduling information borrows a format of the scheduling information of format 1C, which is of severely compressed format, and has a load size much smaller than that of format 1A, and then the common control channel not only carries original configuration information, but also borrows the format of the scheduling information of format 1C, so that the load size can be equal to that of the format 1A, and the times of blind detection in the common search space will not be increased.

According to another embodiment of the present invention, the common control channel can be PDCCH or ePDCCH originally scheduling the first system information block, wherein the first system information block may be SIB1, and the SIB1 can configure a time window for transmitting other SIBs, such as SIB2 through SIB13. Then assuming that a system will not transmit PBCH or ePBCH, and therefore, the information carried by the PBCH or ePBCH, such as, at least one of actual downlink resource bandwidth of the cell, system radio frame number, antenna port number, antenna port numbers, PHICH configuration information, and ePHICH configuration information, can be carried in SIB1 or other SIB, so that the system design can be simplified, and separate physical channel of PBCH or ePBCH can be saved.

Optionally, the transmitting the common control channel of the cell on the at least one first resource includes: transmitting, in a first subframe, a first common control channel of the cell on a third candidate resource in the at least one first resource, and transmitting, in a second subframe, a second common control channel of the cell on a fourth candidate resource in the at least one first resource, wherein the first subframe and the second subframe are two subframes with different times, the third candidate resource and the fourth candidate resource have different frequency resource positions, and the first common control channel and the second common control channel carry the same original bit information.

In another embodiment, it is assumed that at least one candidate resource of the common control channel is resources a, b, c and d, the four candidate resources have different frequency domain positions and the time domain resources for transmitting the common control channel are frame 1, frame 2, frame 3 and frame 4. Particularly, four candidate resources are included in each group, a plurality of candidate resources in each group are distributed in at least two subframes (four subframes in this example), and the candidate resources in at least two subframes have different frequency domain positions, for example, the common control channel of a cell is actually transmitted by the resources (i.e., the common control channel detected resources) which are four resources on four subframes of a first set, specifically, subframe 1 is transmitted on a, subframe 2 is transmitted on b, subframe 3 is transmitted on c, subframe 4 is transmitted on d; the common control channel of another cell is actually transmitted by the resources (i.e., the common control channel detected resources) which are four resources on four subframes of a second set, specifically, subframe 1 is transmitted on b, subframe 2 is transmitted on c, subframe 3 is transmitted on d, subframe 4 is transmitted on a; still another cell with a third set of c, d, a, b; yet another cell with a fourth set of d, a, b, c; the above cyclic resource reuse is just an example, the common control channel carried by the candidate resources in each candidate resource set corresponds different transmission copies of the same cell, for example, if PBCH or ePBCH is transmitted once in each frame, and four transmissions in the continuous four frames correspond to the same original information copy, that is, the UE can perform a combination to improve performance. The candidate resources of the common control channel for carrying the same copy of information in each group occupy different frequency domain positions, so that frequency diversity gain can be obtained, and a detection performance of the common control channel can be improved.

Further, the candidate resources corresponding to time domain resources of the first common control channel can be overlapped with the candidate resources corresponding to time domain resources of the second common control channel, where the first common control channel and the second common control channel are the common control channels for carrying different original bit information in the current cell.

In another embodiment, it is assumed that at least one candidate resource of the common control channel is resources a, b, c and d, and the time domain resources for transmitting the common control channel are frame 1, frame 2, frame 3 and frame 4. One set of manner for transmitting the common control channel is that, frames 1 and 2 are transmitted on a, frames 3 and 4 are transmitted on b, and another set of manner for transmitting the common control channel is that, frames 1 and 2 are transmitted on b, frames 3 and 4 are transmitted on c. The partially overlapped configuration can be applied when the total resources are limited, that is, a certain flexibility of interference coordination can be obtained when the total resources are limited. In addition, the solution that resources are partially overlapped in the common control channel of multiple cells can make interference randomization when the total resources are limited.

Figure 7:
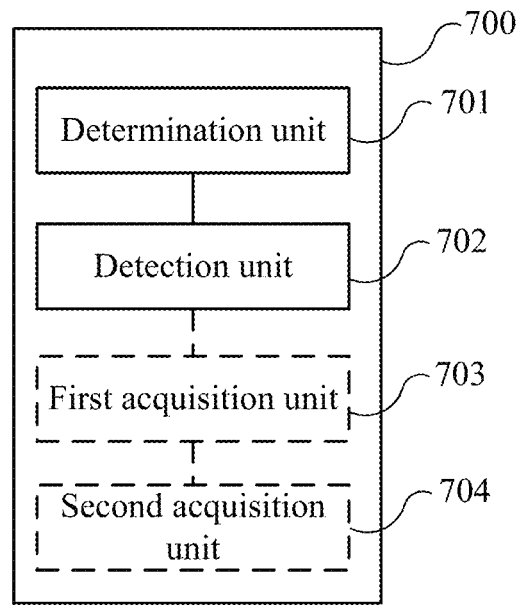
FIG. 7 is a schematic block diagram of a user equipment according to an embodiment of the present invention.

FIG. 7 is a schematic block diagram of a user equipment 700 according to an embodiment of the present invention. The user equipment 700 can include a determination unit 701 and a detection unit 702.

The determination unit 701 can determine a candidate resource set within virtual downlink resources of a current cell, wherein the virtual downlink resources are configured to detect a common control channel of the current cell, and the candidate resource set includes at least one candidate resource of the common control channel of the current cell.

The detection unit 702 can perform a detect on at least one candidate resource in the candidate resource set, so as to acquire the common control channel of the current cell.

In embodiments of the present invention, the user equipment 700 acquires the candidate resource set within the virtual downlink resources of the cell, and detects within the candidate resource set so as to acquire the common control channel of the cell, so that inter-cell interference of the common control channel can be coordinated, and a detection performance of the common control channel can be improved.

Optionally, the user equipment 700 further includes a first acquisition unit 703. The first acquisition unit 703 can acquire frequency domain position information of the current cell, where the frequency domain position information includes a central frequency point position of the current cell and/or a frequency domain central resource position of the current cell. The determination unit 702 further can determine the virtual downlink resources according to the frequency domain position information.

Optionally, the user equipment 700 further includes a second acquisition unit 704. The second acquisition unit 704 can acquire a physical cell identifier PCI of the current cell.

Optionally, the detection unit 702 further specifically can perform the detection on at least one candidate resource in the candidate resource set according to the PCI, so as to acquire the common control channel of the current cell.

Optionally, the determination unit 701 specifically can determine at least one first candidate resource from the candidate resource set according to the PCI, where the number of the at least one first candidate resource is less than or equal to the number of the candidate resources in the candidate resource set. The detection unit 702 specifically can perform the detection on at least one first candidate resource, so as to acquire the common control channel of the current cell.

Optionally, the candidate resource set includes at least one candidate resource subset, and each candidate resource subset in the candidate resource set corresponds to an actual downlink resource bandwidth of the current cell.

Further, a resource unit of the candidate resources in the candidate resource subset has a maximum frequency domain width less than or equal to half of the actual downlink resource bandwidth corresponding to the candidate resource subset, and the resource unit is a physical block PRB, a PRB pair, a control channel element or a resource element group, which consist of the candidate resource in the candidate resource subset.

Further, one of the candidate resources in the candidate resource subset is a frequency domain shift copy of the other candidate resource in the candidate resource subset.

Further, the determination unit 701 further can determine at least one first candidate resource respectively in each candidate resource subset in the candidate resource set according to the PCI. The detection unit 702 specifically can perform the detection on at least one first candidate resource, so as to acquire the common control channel of the current cell.

Optionally, the determination unit 701 further can determine, according to position information of common control channel detected resources, the actual downlink resource bandwidth of the current cell, where the common control channel detected resources are candidate resources detecting the common control channel of the current cell; or the determination unit 701 further can determine, according to downlink resource bandwidth indication information carried by the common control channel of the current cell, the actual downlink resource bandwidth of the current cell.

Further, the determination unit 701 specifically can determine, according to the common control channel detected resources of the cell to be determined, a first downlink resource bandwidth. If positional relationship between the common control channel detected resources of the cell to be determined and the current cell conforms to the positional relationship indicated by resource position indication information carried by the common control channel of the cell to be determined, then the determination unit 701 is further specifically configured to determine that the first downlink resource bandwidth is an actual downlink resource bandwidth of the current cell, where the resource position indication information carried by the common control channel of the cell to be determined indicates the positional relationship between the common control channel detected resources of the cell to be determined and the cell to be determined.

Or, further, the determination unit 701 further specifically can determine, according to downlink resource bandwidth indication information carried by the common control channel of the cell to be determined, a second downlink resource bandwidth. If the common control channel detected resources of the cell to be determined are within a frequency resource range of undetermined downlink resources of the current cell, then the determination unit 701 is further specifically configured to determine that the second downlink resource bandwidth is an actual downlink resource bandwidth of the current cell, where the undetermined downlink resources of the current cell are downlink resources of a cell when the second downlink resource bandwidth is a bandwidth of the current cell.

Optionally, the determination unit 701 is further specifically configured to determine, according to position information of common control channel detected resources, actual resources of common search space of the current cell, where the common control channel detected resources are candidate resources detecting the common control channel of the current cell, and the actual resources are resources actually used by the common search space of the current cell.

The determination unit 701 further can acquire, according to the position information of the common control channel detected resources, candidate resources where the common control channel detected resources are located, and determine, according to corresponding relationship between candidate resources of common search space and candidate resources of the common control channel, that the candidate resources of the common search space corresponding to the candidate resources where the common control channel detected resources are located are the actual resources of the common search space, wherein the candidate resources of the common search space are candidate resources in the candidate resource set or candidate resources in a first common search space candidate resource set corresponding to the candidate resource set.

Optionally, the determination unit 701 further can determine, according to the common search space indication information carried by the common control channel of the current cell, actual resources of common search space of the current cell, wherein the actual resources are resources actually used by the common search space of the current cell.

Further, the determination unit 701 further specifically can determine that all or a part of the candidate resources in the candidate resources indicated by the common search space indication information are actual resources of the common search space of the current cell, wherein the candidate resources indicated by the common search space indication information are candidate resources in the candidate resource set or candidate resources in a first common search space candidate resource set corresponding to the candidate resource set.

Or, further, the determination unit 701 specifically can determine, according to the position information of the common control channel detected resources and the common search space indication information carried by the common control channel of the current cell, the actual resources of the common search space of the current cell, wherein the common control channel detected resources are candidate resources detecting the common control channel of the current cell.

Further, the determination unit 701 further specifically can determine, according to the position information of the common control channel detected resources, a second common search space candidate resource set of the current cell, and determine, according to the common search space indication information carried by the common control channel of the current cell and the second common search space candidate resource set, actual resources of common search space of the current cell, wherein the second common search space candidate resource set is a subset of the candidate resource set or a subset of the first common search space candidate resource set corresponding to the candidate resource set.

Optionally, the determination unit 701 further can determine, according to the PCI, that all or a part of the candidate resources in the candidate resource set are candidate resources of the common search space of the current cell.

Further, if the candidate resources of the common search space of the current cell are a part of candidate resources in the candidate resource set, then the determination unit 701 further can perform the detection on the candidate resources other than candidate resources of the common search space of the current cell in the candidate resource set, so as to acquire the common control channel of the current cell.

Optionally, the determination unit 701 specifically can determine, according to the PCI of the current cell and/or the position information of the common control channel detected resources, a first part of resources of the common search space of the current cell, and determine, according to common search space indication information carried by the common control channel of the current cell, a second part of resources of the common search space of the current cell; wherein the actual resources of common search space of the current cell include the first part of resources and the second part of resources.

Optionally, the width of the virtual downlink resources is greater than or equal to the actual downlink resource bandwidth of the current cell; and/or the width of the virtual downlink resources is greater than or equal to a predefined downlink resource bandwidth.

Optionally, the common control channel also can carry at least one of the following information: actual downlink resource bandwidth information of the current cell, system radio frame number, antenna port number, antenna port numbers, physical hybrid automatic repeat request indicator channel PHICH configuration information, enhanced physical hybrid automatic repeat request indicator channel ePHICH configuration information, scheduling information of a first system information block SIB1 in a system information block SIB and configuration information of SIB other than the SIB1.

Optionally, the detection unit 702 is further specifically configured to detect, in a first subframe, a first common control channel of the current cell on a third candidate resource in the at least one candidate resource, and detect, in a second subframe, a second common control channel of the current cell on a fourth candidate resource in the at least one candidate resource, wherein the first subframe and the second subframe are two subframes with different times, the third candidate resource and the fourth candidate resource have different frequency resource positions, and the first common control channel and the second common control channel carry the same original bit information.

The user equipment 700 also can implement methods for detecting a common control channel of a current cell by the UE as shown in FIG. 1 to FIG. 5, and possesses functions of the UE in the above embodiments, which will not be described in detail here.

Figure 8:
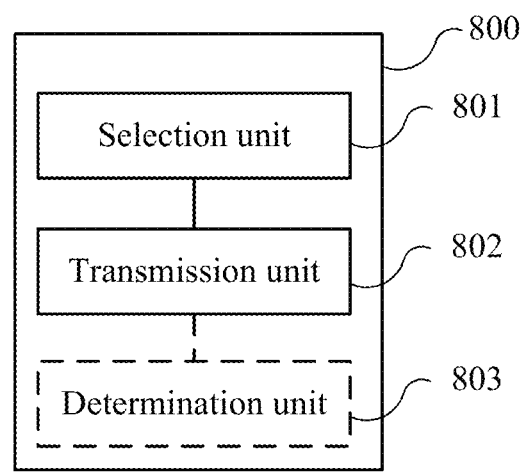
FIG. 8 is a schematic block diagram of a base station according to an embodiment of the present invention.

FIG. 8 is a schematic block diagram of a base station 800 according to an embodiment of the present invention. The base station 800 can include a selection unit 801 and a transmission unit 802.

The selection unit 801 can select at least one first resource from a candidate resource set of a cell.

The transmission unit 802 can transmit a common control channel of the cell on the at least one first resource.

In embodiments of the present invention, the base station 800 determines the candidate resource set of the cell, and transmits the common control channel within the candidate resource set, so that inter-cell interference of the common control channel can be coordinated, and a detection performance of the common control channel can be improved.

Optionally, the base station 800 further can include a determination unit 803. The determination unit 803 can determine the candidate resource set in the actual downlink resources of the cell.

Further, the determination unit 803 is further configured to determine at least one first candidate resource from the candidate resource set according to a physical cell identifier PCI of the cell, where the number of the at least one first candidate resource is less than or equal to the number of the candidate resources in the candidate resource set; the selection unit 801 is further specifically configured to select the at least one first resource from the at least one first candidate resource.

Or, further, the candidate resource set includes at least one candidate resource subset, and each candidate resource subset in the candidate resource set corresponds to an actual downlink resource bandwidth of the cell.

Further, a resource unit of the candidate resource in the candidate resource set has a maximum frequency domain width less than or equal to half of the actual downlink resource bandwidth corresponding to the candidate resources in the candidate resource set, and the resource unit is a physical block PRB, a PRB pair, a control channel element or a resource element group, which consist of the candidate resource.

Further, one of the candidate resources in the candidate resource subset is a frequency domain shift copy of the other candidate resource in the candidate resource subset.

Further, the determination unit 803 is further configured to determine, according to the actual downlink resource bandwidth of the cell, a first candidate resource subset corresponding to the actual downlink resource bandwidth of the cell in the candidate resource set; the selection unit 801 is specifically configured to select at least one first resource from the first candidate resource subset.

Optionally, the common control channel of the cell further carries downlink resource bandwidth indication information for indicating actual downlink resource bandwidth of the cell.

Optionally, the common control channel of the cell further carries resource position indication information for indicating a positional relationship between the candidate resource which transmits the common control channel of the cell and the cell.

Optionally, the position information of the at least one first resource is further used to indicate actual resources of common search space of the cell for a UE.

Further, the common control channel of the cell further carries first common search space indication information for indicating actual resources of the common search space of the cell.

Further, the actual resources indicated by the first common search space indication information are all or a part of the candidate resources in the candidate resource set; or all or a part of the candidate resources in the first common search space candidate resource set corresponding to the candidate resource set.

Or, optionally, the position information of the at least one first resource is further used to indicate a second common search space candidate resource set of the common search space of the cell for a UE, and the second common search space candidate resource set is a subset of the candidate resource set or a subset of the first common search space candidate resource set corresponding to the candidate resource set; the common control channel of the cell further carries third common search space indication information for indicating a position of the actual resources of the common search space of the cell in the second common search space candidate resource set.

Or, optionally, the position information of the at least one first resource is further used to indicate a first part of resources of common search space of the cell for a UE; the common control channel of the current cell further carries fourth common search space indication information for indicating a second part of resources of the common search space of the current cell; and the actual resources of common search space of the current cell include the first part of resources and the second part of resources.

Optionally, if the candidate resources of the common search space of the cell are a part of candidate resources in the candidate resource set, then the selection unit 801 is specifically configured to select at least one first resource from the candidate resources other than resources of the common search space of the cell in the candidate resource set.

Optionally, the common control channel can carry at least one of the following information: actual downlink resource bandwidth information of the cell, system radio frame number, antenna port number, antenna port numbers, physical hybrid automatic repeat request indicator channel PHICH configuration information, enhanced physical hybrid automatic repeat request indicator channel ePHICH configuration information, scheduling information of a first system information block SIB1 in a system information block SIB and configuration information of SIB other than the SIB1.

Optionally, the selection unit 802 is specifically configured to transmit, in a first subframe, a first common control channel of the cell on a third candidate resource in the at least one first resource, and transmit, in a second subframe a second common control channel of the cell on a fourth candidate resource in the at least one first resource, wherein the first subframe and the second subframe are two subframes with different times, the third candidate resource and the fourth candidate resource have different frequency resource positions, and the first common control channel and the second common control channel carry the same original bit information.

The base station 800 also can implement methods for transmitting a common control channel by the base station as shown in FIG. 2 to FIG. 6, and possesses functions of the base station in the above embodiments, which will not be described in detail here.

Figure 9:
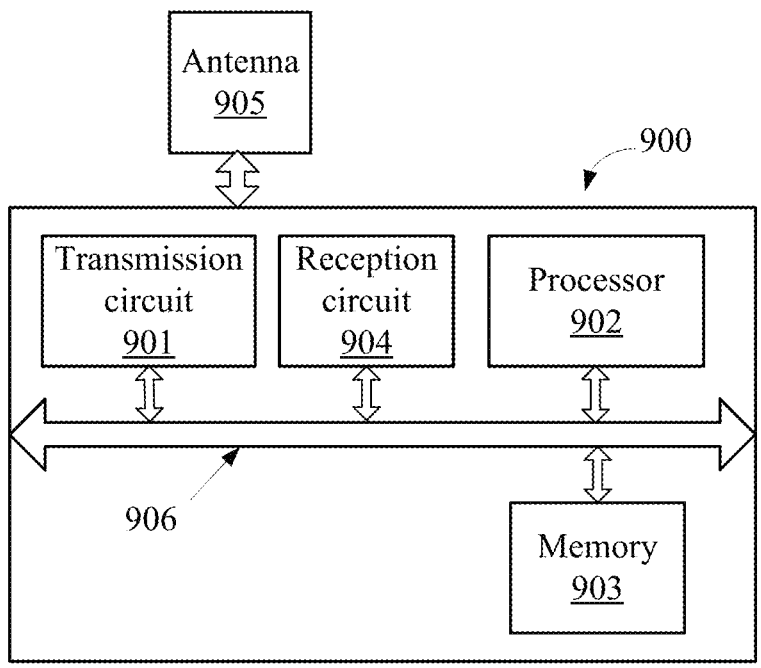
FIG. 9 is a schematic block diagram of a user equipment according to another embodiment of the present invention.

FIG. 9 is a schematic block diagram of a user equipment 900 according to an embodiment of the present invention. The user equipment 900 can include a reception circuit 901, a processor 902 and a storage unit 903.

The processor 902 can determine the candidate resource set within the virtual downlink resources of the current cell, the virtual downlink resources are used to detect the common control channel of the current cell, and the candidate resource set includes at least one candidate resource of the common control channel of the current cell.

The processor 902 also can perform a detection on at least one candidate resource in the candidate resource set through the reception circuit 901, so as to acquire the common control channel of the current cell.

The memory 903 can store instructions enabling the processor 902 to determine the candidate resource set within the virtual downlink resources of the current cell, and perform the detection on at least one candidate resource in the candidate resource set through the reception circuit 901, so as to acquire the common control channel of the current cell.

In embodiments of the present invention, the user equipment 900 acquires the candidate resource set within the virtual downlink resources of the cell, and performs the detection on within the candidate resource set so as to acquire the common control channel of the cell, so that inter-cell interference of the common control channel can be coordinated, and a detection performance of the common control channel can be improved.

In addition, the user equipment 900 also can include a transmission circuit 901, and etc. The processor 902 controls operations of the user equipment 900, and also can be called a central processing unit (CPU). The memory 903 can include a read-only memory and a random access memory and provide instruction and data to the processor 902. A part of the memory 903 also can include a non-volatile random access memory (NVRAM). In particular application, the transmission circuit 901 and the reception circuit 904 can be coupled to an antenna 905. Various components of the user equipment 900 are coupled with each other via a bus system 906, and in addition to a data bus, the bus system 906 also can include a power bus, a control bus, and status signal bus, and etc. For purposes of clarity, however, various buses in the figure all are marked with the bus system 906.

The methods disclosed in the above embodiments of the present invention can be applied to the processor 902, or implemented by the processor 902. The processor 902 can be an integrated circuit chip with capability of processing signals. During the implementation, various steps of the above methods can be accomplished by integrated logic circuits of hardware in the processor 902 or instructions in a software manner. The processor 902 can be a general purpose processor, a digital signal processor (DSP), an application specific integrated circuit (ASIC), a field programmable gate array (FPGA) or other programmable logic devices, a discrete gate or transistor logic device, and a discrete hardware component, which can implement or perform various methods, steps and logic block diagrams disclosed in embodiments of the present invention. The general purpose processor can be a microprocessor or the processor can be any conventional processor. The steps of the method disclosed in conjunction with embodiments of the present invention can be directly embodied in that, a hardware decoding processor executes to completion, or hardware in the decoding processor and software modules jointly execute to completion. The software modules may be located in a random memory, a flash memory, a read only memory, a programmable read only memory or an electrically erasable and programmable memory, a register, or any other mature storage medium known in the art. The storage medium is located in the memory 903, and the processor 902 reads information in the memory 903 and accomplishes the foregoing method steps in conjunction with its hardware.

Optionally, the processor 902 also can acquire frequency domain position information of the current cell, and determine the virtual downlink resources according to the frequency domain position information. The frequency domain position information includes a central frequency point position of the current cell and/or a frequency domain central resource position of the current cell.

Optionally, the processor 902 also can acquire the PCI of the current cell through the reception circuit 901.

Optionally, the processor 902 specifically can perform the detection on at least one candidate resource in the candidate resource set according to the PCI through the reception circuit 901, so as to acquire the common control channel of the current cell.

Optionally, the processor 902 specifically can determine at least one first candidate resource from the candidate resource set according to the PCI, and perform the detection on at least one first candidate resource according to the PCI through the reception circuit 901, so as to acquire the common control channel of the current cell, wherein the number of the at least one first candidate resource is less than or equal to the number of the candidate resources in the candidate resource set.

Optionally, the candidate resource set includes at least one candidate resource subset, and each candidate resource subset in the candidate resource set corresponds to an actual downlink resource bandwidth of the current cell.

Further, a resource unit of the candidate resource in the candidate resource subset has a maximum frequency domain width less than or equal to half of the actual downlink resource bandwidth corresponding to the candidate resource subset, and the resource unit is a physical block PRB, a PRB pair, a control channel element or a resource element group, which consist of the candidate resource in the candidate resource subset.

Further, one of the candidate resources in the candidate resource subset is a frequency domain shift copy of the other candidate resource in the candidate resource subset.

Further, the processor 902 also can determine at least one first candidate resource respectively in each candidate resource subset in the candidate resource set according to the PCI, and perform the detection on at least one first candidate resource through the reception circuit 901, so as to acquire the common control channel of the current cell.

Optionally, the processor 902 specifically can determine, according to position information of common control channel detected resources, the actual downlink resource bandwidth of the current cell, and the common control channel detected resources are candidate resources detecting the common control channel of the current cell; or the processor 902 also can determine, according to downlink resource bandwidth indication information carried by the common control channel of the current cell, the actual downlink resource bandwidth of the current cell.

Further, the processor 902 specifically can determine, according to the common control channel detected resources of the cell to be determined, a first downlink resource bandwidth. If positional relationship between the common control channel detected resources of the cell to be determined and the current cell conforms to the positional relationship indicated by resource position indication information carried by the common control channel of the cell to be determined, then the processor 902 is further specifically configured to determine that the first downlink resource bandwidth is an actual downlink resource bandwidth of the current cell, wherein the resource position indication information carried by the common control channel of the cell to be determined indicates the positional relationship between the common control channel detected resources of the cell to be determined and the cell to be determined.

Or, further, the processor 902 is further specifically configured to determine, according to downlink resource bandwidth indication information carried by the common control channel of the cell to be determined, a second downlink resource bandwidth. If the common control channel detected resources of the cell to be determined are within a frequency resource range of undetermined downlink resources of the current cell, then the processor 902 is further specifically configured to determine that the second downlink resource bandwidth is an actual downlink resource bandwidth of the current cell, wherein the undetermined downlink resources of the current cell are downlink resources of a cell when the second downlink resource bandwidth is a bandwidth of the current cell.

Optionally, the processor 902 is further specifically configured to determine, according to position information of common control channel detected resources, actual resources of common search space of the current cell, where the common control channel detected resources are candidate resources detecting the common control channel of the current cell, and the actual resources are resources actually used by the common search space of the current cell.

The processor 902 further can acquire, according to the position information of the common control channel detected resources, candidate resources where the common control channel detected resources are located, and determine, according to corresponding relationship between candidate resources of common search space and candidate resources of the common control channel, that the candidate resources of the common search space corresponding to the candidate resources where the common control channel detected resources are located are the actual resources of the common search space, wherein the candidate resources of the common search space are candidate resources in the candidate resource set or candidate resources in a first common search space candidate resource set corresponding to the candidate resource set.

Optionally, the processor 902 further can determine, according to the common search space indication information carried by the common control channel of the current cell, actual resources of common search space of the current cell, wherein the actual resources are resources actually used by the common search space of the current cell.

Further, the processor 902 further specifically can determine that all or a part of the candidate resources in the candidate resources indicated by the common search space indication information are actual resources of the common search space of the current cell, wherein the candidate resources indicated by the common search space indication information are candidate resources in the candidate resource set or candidate resources in a first common search space candidate resource set corresponding to the candidate resource set.

Or, further, the processor 902 further specifically can determine, according to the position information of the common control channel detected resources and the common search space indication information carried by the common control channel of the current cell, the actual resources of the common search space of the current cell, wherein the common control channel detected resources are candidate resources detecting the common control channel of the current cell.

Further, the processor 902 further specifically can determine, according to the position information of the common control channel detected resources, a second common search space candidate resource set of the current cell, and determine, according to the common search space indication information carried by the common control channel of the current cell and the second common search space candidate resource set, actual resources of common search space of the current cell, wherein the second common search space candidate resource set is a subset of the candidate resource set or a subset of the first common search space candidate resource set corresponding to the candidate resource set.

Optionally, the processor 902 further can determine, according to the PCI, that all or a part of the candidate resources in the candidate resource set are candidate resources of the common search space of the current cell.

Further, if the candidate resources of the common search space of the current cell are a part of candidate resources in the candidate resource set, then the processor 902 further can perform the detection on the candidate resources other than candidate resources of the common search space of the current cell in the candidate resource set, so as to acquire the common control channel of the current cell.

Optionally, the processor 902 specifically can determine, according to the PCI of the current cell and/or the position information of the common control channel detected resources, a first part of resources of the common search space of the current cell, and determine, according to common search space indication information carried by the common control channel of the current cell, a second part of resources of the common search space of the current cell; wherein the actual resources of common search space of the current cell include the first part of resources and the second part of resources.

Optionally, the width of the virtual downlink resources is greater than or equal to the actual downlink resource bandwidth of the current cell; and/or the width of the virtual downlink resources is greater than or equal to a predefined downlink resource bandwidth.

Optionally, the common control channel also can carry at least one of the following information: actual downlink resource bandwidth information of the current cell, system radio frame number, antenna port number, antenna port numbers, physical hybrid automatic repeat request indicator channel PHICH configuration information, enhanced physical hybrid automatic repeat request indicator channel ePHICH configuration information, scheduling information of a first system information block SIB1 in a system information block SIB and configuration information of SIB other than the SIB1.

Optionally, the processor 902 specifically detects, in a first subframe, a first common control channel of the current cell on a third candidate resource in the at least one candidate resource through the reception circuit 901, and detecting, in a second subframe, a second common control channel of the current cell on a fourth candidate resource in the at least one candidate resource, wherein the first subframe and the second subframe are two subframes with different times, the third candidate resource and the fourth candidate resource have different frequency resource positions, and the first common control channel and the second common control channel carry the same original bit information.

The user equipment 900 also can implement methods for detecting a common control channel of a current cell by the UE as shown in FIG. 1 to FIG. 5, and possesses functions of the UE in the above embodiments, which will not be described in detail here.

Figure 10:
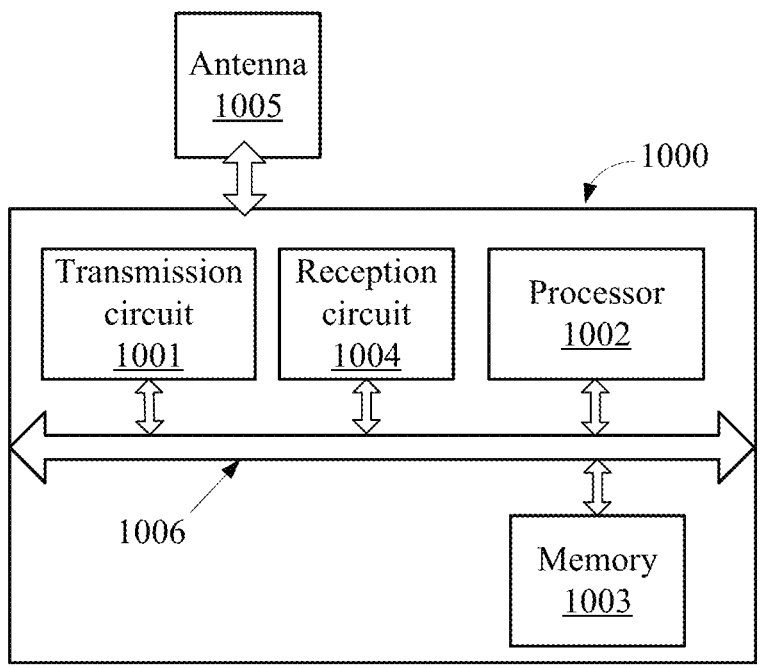
FIG. 10 is a schematic block diagram of a base station according to another embodiment of the present invention.

FIG. 10 is a schematic block diagram of a base station 1000 according to an embodiment of the present invention. The base station 1000 can include a processor 1002, a memory 1003 and a transmission circuit 1001.

The processor 1002 can select at least one first resource from a candidate resource set of a cell.

The memory 1003 can store an instruction enabling the processor 1002 to select at least one first resource from the candidate resource set of the cell.

The transmission circuit 1001 can transmit a common control channel of the cell on the at least one first resource.

In embodiments of the present invention, the base station 1000 determines the candidate resource set of the cell, and transmits the common control channel within the candidate resource set, so that inter-cell interference of the common control channel can be coordinated, and a detection performance of the common control channel can be improved.

In addition, the base station 1000 further can include a reception circuit 1004 and so on. The processor 1002 controls operations of the user equipment 1000, and also can be called a central processing unit (CPU). The memory 1003 can include a read-only memory and a random access memory, and provide instructions and data to the processor 1002. A part of the memory 1003 also can include a non-volatile random access memory (NVRAM). In specific applications, the transmission circuit 1001 and the reception circuit 1004 can be coupled to an antenna 1005. Various components of the base station 1000 are coupled with each other via a bus system 1006, and in addition to a data bus, the bus system 66 also can include a power bus, a control bus, and status signal bus, and etc. For purposes of clarity, however, various buses in the figure all are marked with the bus system 1006.

The methods disclosed in the above embodiments of the present invention can be applied to the processor 1002, or implemented by the processor 1002. The processor 1002 can be an integrated circuit chip with capability of processing signals. During the implementation, various steps of the above methods can be accomplished by integrated logic circuits of hardware in the processor 1002 or instructions in a software manner. The processor 1002 can be a general purpose processor, a digital signal processor (DSP), an application specific integrated circuit (ASIC), a field programmable gate array (FPGA) or other programmable logic devices, a discrete gate or transistor logic device, and a discrete hardware component, which can implement or perform various methods, steps and logic block diagrams disclosed in embodiments of the present invention. The general purpose processor can be a microprocessor or the processor can be any conventional processor. The steps of the method disclosed in conjunction with embodiments of the present invention can be directly embodied in that, a hardware decoding processor executes to completion, or hardware in the decoding processor and software modules jointly execute to completion. The software modules may be located in a random memory, a flash memory, a read only memory, a programmable read only memory or an electrically erasable and programmable memory, a register, or any other mature storage medium known in the art. The storage medium is located in the memory 1003, and the processor 1002 reads information in the memory 1003 and accomplish the foregoing method steps in conjunction with its hardware.

Optionally, the processor 1002 can determine the candidate resource set in the actual downlink resources of the cell.

Further, the processor 1002 is further configured to determine at least one first candidate resource from the candidate resource set according to a physical cell identifier PCI of the cell, and select at least one first resource from the at least one first candidate resource. The number of the at least one first candidate resource is less than or equal to the number of the candidate resources in the candidate resource set.

Or, further, the candidate resource set includes at least one candidate resource subset, and each candidate resource subset in the candidate resource set corresponds to an actual downlink resource bandwidth of the cell.

Further, a resource unit of the candidate resource in the candidate resource set has a maximum frequency domain width less than or equal to half of the actual downlink resource bandwidth corresponding to the candidate resources in the candidate resource set, and the resource unit is a physical block PRB, a PRB pair, a control channel element or a resource unit group, which consist of the candidate resource.

Further, one of the candidate resources in the candidate resource subset is a frequency domain shift copy of the other candidate resource in the candidate resource subset.

Further, the processor 1002 is further configured to determine, according to the actual downlink resource bandwidth of the cell, a first candidate resource subset corresponding to the actual downlink resource bandwidth of the cell in the candidate resource set; and select at least one first resource from the first candidate resource subset.

Optionally, the common control channel of the cell further carries downlink resource bandwidth indication information for indicating actual downlink resource bandwidth of the cell.

Optionally, the common control channel of the cell further carries resource position indication information for indicating a positional relationship between the candidate resource which transmits the common control channel of the cell and the cell.

Optionally, the position information of the at least one first resource is further used to indicate actual resources of common search space of the cell for a UE.

Further, the common control channel of the cell further carries first common search space indication information for indicating actual resources of the common search space of the cell.

Further, the actual resources indicated by the first common search space indication information are all or a part of the candidate resources in the candidate resource set; or all or a part of the candidate resources in the first common search space candidate resource set corresponding to the candidate resource set.

Or optionally, the position information of the at least one first resource is further used to indicate a second common search space candidate resource set of the common search space of the cell for a UE, and the second common search space candidate resource set is a subset of the candidate resource set or a subset of the first common search space candidate resource set corresponding to the candidate resource set; the common control channel of the cell further carries third common search space indication information for indicating a position of the actual resources of the common search space of the cell in the second common search space candidate resource set.

Or, optionally, the position information of the at least one first resource is further used to indicate a first part of resources of common search space of the cell for a UE; the common control channel of the current cell further carries fourth common search space indication information for indicating a second part of resources of the common search space of the current cell; and the actual resources of common search space of the current cell include the first part of resources and the second part of resources.

Optionally, if the candidate resources of the common search space of the cell are a part of candidate resources in the candidate resource set, then the processor 1002 is specifically configured to select at least one first resource from the candidate resources other than resources of the common search space of the cell in the candidate resource set.

Optionally, the common control channel can carry at least one of the following information: actual downlink resource bandwidth information of the cell, system radio frame number, antenna port number, antenna port numbers, physical hybrid automatic repeat request indicator channel PHICH configuration information, enhanced physical hybrid automatic repeat request indicator channel ePHICH configuration information, scheduling information of a first system information block SIB1 in a system information block SIB and configuration information of SIB other than the SIB1.

Optionally, the processor 1002 is specifically configured to transmit, in a first subframe, a first common control channel of the cell on a third candidate resource of the at least one first resource, and transmit, in a second subframe, a second common control channel of the cell on a fourth candidate resource of the at least one first resource, wherein the first subframe and the second subframe are two subframes with different times, the third candidate resource and the fourth candidate resource have different frequency resource positions, and the first common control channel and the second common control channel carry the same original bit information.

The base station 1000 also can implement methods for transmitting a common control channel by the base station as shown in FIG. 2 to FIG. 6, and possesses functions of the base station in the above embodiments, which will not be described in detail here.

Understandably, in various embodiments of the present invention, the size of the serial number for each process does not mean the successive execution sequence, and the execution sequence for each process should be determined depending on its function and internal logic, but not intended to limit the process of implementing embodiments of the present invention.

Persons skilled in the art are aware that the various exemplary units and algorithm steps described in connection with the embodiments disclosed herein can be implemented as electronic hardware, or a combination of computer software and electronic hardware. Whether these functions are executed through hardware or software depends on special applications of the technical solutions and design restrictions. Professional technicians may implement the described functions in varying ways for each special application, but such implementation decisions should not be interpreted as causing a departure from the scope of the present invention.

Persons skilled in the art can understand that, for convenience and brevity of description, the detailed working procedures of the systems, apparatuses, and units described above can be referred to the corresponding procedures in the method embodiments, and are not repeated herein.

Understandably, in the embodiments provided by the present application, the disclosed systems, apparatuses and methods may be implemented in other modes. For example, the device embodiments above are only illustrative, and the units of the device are divided from the perspective of logical functions only and may be divided in a different way in practical application. For example, multiple units or components may be combined or integrated into another system, or some features may be ignored or not executed. Besides, the coupling, direct coupling or communication connection illustrated or discussed herein may be implemented through some interfaces, and indirect coupling or communication connection between devices or units may be electronic, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the embodiment solutions of the present invention.

Besides, all functional units in the embodiments of the present invention may be physically stand-alone, or integrated into a processing unit, or two or more of the units are integrated into one unit.

When being implemented as a software function unit and sold or used as a stand-alone product, the functions may be stored in a computer-readable storage medium. Based on this understanding, the essence of the technical solution of the present invention, or its contribution to the prior art, or part of the technical solutions, may be embodied in a software product. The computer software product may be stored in a storage medium and incorporates several instructions for instructing one computer device (for example, personal computer, server, or network device) to execute all or part of the steps of the method specified in the respective embodiment of the present invention. Examples of the storage medium include various media capable of storing program codes, such as a USB disk, a mobile hard disk, a read-only memory (ROM), a random access memory (RAM), a magnetic disk, or an optical disk.

The above descriptions are merely concrete embodiments of the present invention, but not intended to limit the protection scope of the present invention. Any variations or replacement that can be easily derived by persons skilled in the art without departing from the technical scope disclosed by the present invention shall fall within the protection scope of the present invention. Therefore, the protection scope of the present invention is subject to the appended claims.

The invention claimed is:

1. A method, comprising:
   selecting, by a network device, a first resource from a first candidate resource set within downlink resources of a cell; and
   transmitting, by the network device, a first common control channel on the first resource, wherein the first common control channel carries a common search space indication information, the common search space indication information and position information of the first resource are used to indicate an actual resource of a common search space in a second candidate resource set of the cell, the second candidate resource set is a subset of a common search space candidate resource set, the common search space candidate resource set comprises at least two subsets, and each subset of the at least two subsets corresponds to a candidate resource of the first candidate resource set; and
   transmitting, by the network device, a second common control channel in the common search space.

2. The method according to claim 1, wherein the actual resource indicated by the common search space indication information is all or a part of a candidate resource of the first candidate resource set.

3. The method according to claim 1, wherein the downlink resources are candidate resources for detecting the first common control channel of the cell, and a bandwidth of the downlink resources is equal to a predefined value.

4. The method according to claim 1, wherein the first common control channel carries a system radio frame number.

5. The method according to claim 4, wherein the first common control channel is a physical broadcasting channel.

6. An apparatus, comprising:
   a storage medium including executable instructions; and
   a processor;
   wherein the executable instructions, when executed by the processor, cause the apparatus to:
   select a first resource from a first candidate resource set within downlink resources of a cell;
   transmit a first common control channel on the first resource, wherein the first common control channel carries a common search space indication information, the common search space indication information and position information of the first resource are used to indicate an actual resource of a common search space in a second candidate resource set of the cell, the second candidate resource set is a subset of a common search space candidate resource set, the common search space candidate resource set comprises at least two subsets, and each subset of the at least two subsets corresponds to a candidate resource of the first candidate resource set; and
   transmit a second common control channel in the common search space.

7. The apparatus according to claim 6, wherein the actual resource indicated by the common search space indication information is all or a part of a candidate resource of the first candidate resource set.

8. The apparatus according to claim 6, wherein the downlink resources are candidate resources for detecting the first common control channel of the cell, and a bandwidth of the downlink resources is equal to a predefined value.

9. The apparatus according to claim 6, wherein the first common control channel carries a system radio frame number.

10. The apparatus according to claim 9, wherein the first common control channel is a physical broadcasting channel.

11. A non-transitory computer-readable storage medium comprising instructions which, when executed by a computer, cause the computer to carry out the steps of:
    selecting a first resource from a first candidate resource set within downlink resources of a cell;
    transmitting a first common control channel on the first resource, wherein the first common control channel carries a common search space indication information, the common search space indication information and position information of the first resource are used to indicate an actual resource of a common search space in a second candidate resource set of the cell, the second candidate resource set is a subset of a common search space candidate resource set, the common search space candidate resource set comprises at least two subsets, and each subset of the at least two subsets corresponds to a candidate resource of the first candidate resource set; and transmitting a second common control channel in the common search space.

12. The non-transitory computer-readable storage medium according to claim 11, wherein the actual resource indicated by the common search space indication information is all or a part of a candidate resource of the first candidate resource set.

13. The non-transitory computer-readable storage medium according to claim 11, wherein the downlink resources are candidate resources for detecting the first common control channel of the cell, and a bandwidth of the downlink resources is equal to a predefined value.

14. The non-transitory computer-readable storage medium according to claim 11, wherein the first common control channel carries a system radio frame number.

15. The non-transitory computer-readable storage medium according to claim 14, wherein the first common control channel is a physical broadcasting channel.

* * * * *